(12) United States Patent
Doeppling et al.

(10) Patent No.: US 8,382,379 B2
(45) Date of Patent: Feb. 26, 2013

(54) BALL ROLLER BEARING AND METHOD FOR THE INSTALLATION OF SUCH A BALL ROLLER BEARING

(75) Inventors: Horst Doeppling, Herzogenaurach (DE); Ernst Geiger, Hallerndorf (DE); Heinrich Hofmann, Schweinfurt (DE); Werner Wirth, Gerhardshofen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 157 days.

(21) Appl. No.: 12/936,011

(22) PCT Filed: Mar. 28, 2009

(86) PCT No.: PCT/EP2009/002286
§ 371 (c)(1),
(2), (4) Date: Oct. 19, 2010

(87) PCT Pub. No.: WO2009/121533
PCT Pub. Date: Oct. 8, 2009

(65) Prior Publication Data
US 2011/0026866 A1 Feb. 3, 2011

(30) Foreign Application Priority Data
Apr. 3, 2008 (DE) .......................... 10 2008 016 977

(51) Int. Cl.
*F16C 33/34* (2006.01)
*F16C 33/46* (2006.01)
(52) U.S. Cl. .................... 384/568; 384/572
(58) Field of Classification Search ............. 384/447, 384/450, 491, 510, 513–516, 558, 560, 572–580, 384/619
See application file for complete search history.

(56) References Cited

U.S. PATENT DOCUMENTS

| | | | | |
|---|---|---|---|---|
| 3,020,106 | A * | 2/1962 | Mims | 384/568 |
| 3,620,585 | A * | 11/1971 | Anderson et al. | 384/491 |
| 5,295,749 | A * | 3/1994 | Takahashi et al. | 384/568 |
| 6,575,631 | B2 * | 6/2003 | Shoda et al. | 384/47 |
| 2002/0085773 | A1 | 7/2002 | Shoda et al. | |
| 2005/0117827 | A1 * | 6/2005 | Fujii et al. | 384/510 |

FOREIGN PATENT DOCUMENTS

| CN | 1639475 A | 7/2005 |
|---|---|---|
| DE | 151 483 | 5/1904 |
| DE | 24 07 477 | 8/1974 |
| DE | 43 34 195 | 3/1994 |
| DE | 10 2005 014 556 A | 10/2006 |
| DE | 10 2006 019 228 A | 10/2007 |

* cited by examiner

*Primary Examiner* — Phillip A Johnson
(74) *Attorney, Agent, or Firm* — Lucas & Mercanti, LLP; Klaus P. Stoffel

(57) ABSTRACT

A ball roller bearing and to a method for the installation thereof. The ball roller bearing has an outer bearing race, and an inner bearing race, and a plurality of ball rollers, which are disposed between the bearing races and are held at equal distances to each other by a bearing cage. For this purpose, the ball rollers have a width of approximately 70% of the diameter of a spherical shape thereof, and roll with bearing surfaces thereof in two groove-shaped raceways, the depth of which is smaller than the distance between the outer and inner bearing race. The cage pockets of the bearing cage have a cross-sectional contour of a ball roller disposed in the longitudinal and transverse directions to the circumferential direction. The method for installation of the ball roller bearing is a cross/oblique pivot mount between the inner and outer bearing races and the ball rollers.

19 Claims, 19 Drawing Sheets

US 8,382,379 B2

BALL ROLLER BEARING AND METHOD FOR THE INSTALLATION OF SUCH A BALL ROLLER BEARING

This application is a 371 of PCT/EP2009/002286 filed Mar. 28, 2009, which in turn claims the priority of DE 10 2008 016 977.3 filed Apr. 3, 2008, the priority of both applications is hereby claimed and both applications are incorporated by reference herein.

FIELD OF THE INVENTION

The invention relates to a ball roller bearing having the features of the preamble of patent claim 1 and to a method for assembling such a ball roller bearing, which can be used with particular advantage as a fixed bearing for the input and output shaft of a motor vehicle shift transmission, for example.

BACKGROUND OF THE INVENTION

It is a matter of common knowledge in the engineering of rolling bearings that deep groove ball bearings are rigid radial rolling bearings which cannot be disassembled, are distinguished especially by equally high radial and axial load bearing capacity and, owing to the low friction thereof, have the highest rotational speed limits of all bearings. These deep groove ball bearings consist essentially of an outer bearing race, an inner bearing race and a number of balls, disposed between the bearing races, as rolling elements which roll on groove-shaped ball raceways machined into the inside of the outer bearing race and into the outside of the inner bearing race and are guided at uniform distances from one another by a bearing cage. Radial ball bearings are filled with the balls by the eccentric assembly method disclosed by DE 168 499, in which the two bearing races are disposed eccentrically relative to one another and the crescent-shaped free space thereby formed between the bearing races is filled with the balls.

However, it has been found in practice that deep groove ball bearings of this kind have their limits in terms of the load bearing capacity of the bearing, owing to the small number of balls that can be installed as a maximum and the low maximum filling ratio of about 60%. In the past, therefore, a plurality of solutions were proposed, e.g. an unclosed filling opening disposed in the mutually opposite rims of the outer and the inner bearing race in accordance with DE 151 483 or a sealable filling opening of similar design in accordance with DE 24 07 477 A1, by means of which the intention was to achieve an increase in the filling ratio and hence in the load bearing capacity of deep groove ball bearings by increasing the number of balls. However, such filling openings have the disadvantage, both in the unclosed and in the closed embodiment, that the rolling elements may "stick" or jam at this filling opening, owing to the wedge-shaped entry of the latter into the ball raceways or owing to burrs, and therefore such solutions have not been accepted in practice.

Another possibility of increasing the number of rolling elements in a radial rolling bearing has furthermore been disclosed by DE 43 34 195 A1. In this radial rolling bearing, however, which is designed per se as a single-row deep groove ball bearing, the rolling elements are not formed by balls but by what are referred to as ball rollers, which are designed with two side faces that are flattened symmetrically as a departure from a basic ball shape and are disposed parallel to one another. Here, the width of these ball rollers between the side faces thereof is made less than the distance between the inside of the outer bearing race and the outside of the inner bearing race, thus allowing the bearing to be filled with the ball rollers by what is referred to as the axial assembly method, in which the ball rollers can be introduced into the bearing more or less horizontally and axially through the gap between the inner and the outer bearing race. When the center of the ball rollers is then at the level of the rolling element raceway axis, the ball disks are rotated by 90°, thus enabling them to roll in the rolling element raceways by means of their spherical bearing surfaces.

However, despite the possibility of inserting these specially designed ball rollers axially into the bearing, thereby enabling the radial rolling bearing to be filled with a large number of rolling elements, such a radial rolling bearing is at best only a compromise in respect of the intended increase in the load bearing capacity of the bearing. This is rooted in the fact that, because of their ability for axial introduction into the bearing, the ball rollers can be designed only with a correspondingly small width between the side faces thereof to enable them to be introduced into the bearing without problems through the gap between the inner and the outer bearing race. The rolling element raceways in the bearing races can likewise only be made relatively shallow and narrow in order to enable the rolling elements to be rotated into the operating position thereof without giving rise to an excessive radial play in the entire bearing in this operating position. However, the relatively narrow ball rollers and the shallow rolling element raceways lead to a relatively small contact area between the ball rollers and the rolling element raceways thereof, thus reducing both the axial and the radial load bearing capacity of such a radial bearing again and almost offsetting the original advantage of the increased number of rolling elements.

To avoid these disadvantages, DE 10 2005 014 556 A1 has therefore proposed to increase the width of the ball rollers between the side faces thereof to at least 70% of the diameter of the basic ball shape thereof and to design the groove-shaped raceways in the bearing races with a depth of about 19% and a width of about 75% of the diameter of the basic ball shape of the ball rollers since this gives a total contact area between the ball rollers and the raceways thereof of about 45% of the circumference of the basic ball shape of the ball rollers, which is also what the balls of conventional deep groove ball bearings have with respect to the raceways thereof in the bearing races. However, since the distance between the outside of the inner bearing race and the inside of the outer bearing race is thereby reduced to about 60% of the diameter of the basic ball shape of the ball rollers and is thus less than the width of the ball rollers, the insertion thereof into the radial rolling bearing was again achieved by the eccentric assembly method, in which the ball rollers are placed transversely in the raceways, in the free space between the two bearing races disposed eccentrically with respect to one another, with their side faces resting against one another, after which the inner bearing race is moved into the position concentric with the outer bearing race and, finally, the ball rollers are distributed at a uniform spacing on the pitch circle of their raceways and swiveled by 90°. The flattened side faces of the ball rollers made it possible here for an increased number of rolling elements to be introduced into the ball roller bearing as compared with single-row deep groove ball bearings, giving a filling ratio of about 73%, even with the eccentric assembly method.

Although it has been possible to ensure with a ball roller bearing designed in this way that the ball rollers have large contact areas with respect to their raceways in the bearing races, like the balls of a deep groove ball bearing, and that the ball roller bearing can be fitted with a larger number of rolling elements and with a higher filling ratio than conventional single-row deep groove ball bearings, it was necessary, owing to the eccentric assembly method, to make compromises in terms of the number of rolling elements compared with the higher number of rolling elements possible in the axial assembly method. Thus, although it was possible to reduce the axial installation space and the weight of the ball roller bearing and increase the axial loading capacity thereof in comparison with conventional deep groove ball bearings, the increase in the radial load bearing capacity of the ball roller bearing was however comparatively small.

OBJECT OF THE INVENTION

Taking as a starting point the disadvantages explained of the solutions of the known prior art, it is therefore the underlying object of the invention to design a ball roller bearing which can be filled with a significantly higher number of ball rollers while maintaining similar raceway dimensions to those of a comparable deep groove ball bearing and, as a result, is distinguished especially by a higher radial load bearing capacity and an increased life.

DESCRIPTION OF THE INVENTION

According to the invention, this object is achieved in on the one hand by virtue of the fact that the bearing cage of the ball roller bearing is designed as a window cage, the individual cage pockets of which each have the integrated overall contour of a cross-sectional contour of a ball roller disposed in the longitudinal and transverse directions relative to the circumferential direction and are disposed spaced apart in such a way that the sum of the distances between the introduced ball rollers at the pitch circle thereof is less than the diameter of the basic ball shape of an individual ball roller.

The invention is thus based on the realization that it is possible in a simple and economical manner with a bearing cage designed in this way to create the conditions for enabling a ball roller bearing with similar raceway dimensions to those of a comparable deep groove ball bearing to be filled with a significantly higher number of ball rollers and, as a result, to be designed in particular with a higher radial load bearing capacity and with a significantly increased life.

Thus, according to another embodiment, it is envisaged that the depth of the groove-shaped raceways is the same in both bearing races and is about 17% to 25% of the diameter of the basic hall shape of the ball rollers. Designing the raceways with such a groove depth corresponds to the empirical values that have proven their worth in conventional deep groove ball bearings and ensures that, depending on the radial bearing clearance, the ball rollers have a high degree of osculation with their raceways, even when there is a permissible skewing of the bearing out of the center position, and thus that the bearing retains the full load bearing capacity.

As an alternative, a further embodiment proposes that the depth of the groove-shaped raceways be different in the two bearing races and be about 17% in the outer hearing race and up to 30% in the inner bearing race of the diameter of the basic ball shape of the ball rollers. Designing the raceways with such groove depths likewise ensures a high degree of osculation of the ball rollers with their raceways but, as will be described below, has proven particularly advantageous especially in respect of easier assembly of the ball roller bearing.

In addition, further embodiments make provision in the ball roller bearing according to the invention for the cross-sectional contour of the cage pockets of the bearing cage which is disposed longitudinally with respect to the circumferential direction to correspond to the shape of a section plane disposed above the transverse axis of a ball roller, while the cross-sectional contour of the cage pockets which is disposed transversely to the circumferential direction has the shape of a section plane disposed directly on the transverse axis of a ball roller and is therefore made somewhat longer. It is a special overall contour of this kind of the cage pockets which for the first time makes it even possible to assemble the ball roller bearing by the method described below, while the cross-sectional contour of the cage pockets which is disposed transversely to the circumferential direction does not contribute to guidance of the rolling elements after assembly of the bearing.

A further feature of the ball roller bearing according to the invention is that the bearing cage initially has a U-shaped profile cross section, the lateral profile webs of which are provided as cage rims for the purpose of avoiding transverse wobbling of the ball rollers. According to still another embodiment, the cage rims have a length such that the end edges thereof are disposed approximately at the level of the pitch circle of the ball roller bearing after inward flanging toward the ball rollers, which concludes the assembly of the bearing, but are not in contact with the ball rollers. The axial guide for the ball rollers which is thus formed by the cage rims has proven advantageous because, while at relatively high rotational speeds and a uniform load, the ball rollers run in a stable manner in their raceways without twisting movements, owing to the gyroscopic effect which arises, and do not require axial guidance by a bearing cage, they have what is referred to as a wobble effect when the bearing is starting up or at a bearing rotational speed below a permissible minimum rotational speed or in the event of a sudden high acceleration, especially in the load-free zone of the bearing, with which effect the ball rollers tend to roil in an undulating manner transversely to the direction of running in their raceways. At the same time, such a design of the cage rims allows automatic pressure angle adjustment of the ball rollers within their raceways of up to ±25°, thus also enabling the ball roller bearing to be subjected to relatively high axial loads within defined limits.

As an advantageous embodiment of the ball roller bearing according to the invention, the bearing cage is produced without machining from a sheet metal strip, on which the cage rims are first shaped by forming. The individual cage pockets are then machined into the formed sheet metal strip by punching, and this is followed by the sheet metal strip being cut to length into individual sheet metal bands with the length of the dimension of the bearing cage circumference. The individual sheet metal bands are then rolled into a ring and, finally, the two ends of the ring are welded together. A production method of this kind is known from needle sleeve manufacture, for example, and has proven particularly suitable also for the manufacture of the bearing cage of the ball roller bearing according to the invention, owing to the favorable production costs.

Finally, according to another embodiment, the bah roller bearing designed in accordance with the invention is distinguished by the fact that, when assembled, it has a rolling element filling ratio of about 85% to 95%. Using as an example a deep groove ball bearing in accordance with DIN/ISO 6207, which can be filled with a maximum of 9 bearing balls and thus has a filling ratio of about 60%, this means that a ball roller bearing according to the invention of the same construction can in contrast be filled with 14 ball rollers. This increases its load bearing capacity to about 1.4 times that of a deep groove ball bearing of the same construction, with the result that its life is about 180% to 240%, based on a figure of 100% for the life of a deep groove ball bearing of the same construction. The decisive advantage of a ball roller bearing according to the invention over the ball roller bearings known from the prior art is thus to be regarded as the fact that, despite raceways of deep construction in the bearing races, which ensures a high axial loading capacity of the ball roller bearing, and despite a resulting reduction in the distance between the bearing races to less than the width of the ball rollers, it has a filling ratio which has hitherto been achievable only with ball roller bearings assembled by the axial assembly method, in which the ball rollers are of significantly narrower design and roll on significantly shallower raceways and in which the distance between the bearing races is greater than the width of the ball rollers.

The object of the invention is also achieved, on the other hand, by a method for assembling a ball roller bearing, which is designed as a cross/oblique/swivel assembly involving the inner bearing race, the bearing cage, the ball rollers and the outer bearing race.

According to this method the bearing assembly first of all begins, in the first assembly step, by arranging the inner bearing race and the bearing cage of the ball roller bearing in a concentric position relative to one another in an at least approximately common plane and, in the second assembly step, inserting the ball rollers in a position turned by 90° relative to the operating position thereof through the cage pockets of the bearing cage, into the raceway of the inner bearing race. According to a further embodiment, this insertion of the ball rollers into the raceway of the inner bearing race is accomplished exclusively through the cross-sectional contour of the cage pockets which is disposed transversely to the circumferential direction, which is machined into the bearing cage for this purpose only.

In the third assembly step, the ball rollers are then swiveled by 90° about the transverse axis thereof within their cage pockets, into a horizontal position, such that the side faces thereof are disposed parallel to the bearing longitudinal axis and that one of the side faces thereof is directly in the raceway of the inner bearing race. According to still another embodiment, the transverse axis about which the ball rollers are swiveled is disposed below the level of the underside of the bearing cage, with the result that the outward facing side faces of the ball rollers, which are then horizontal and which now also fill the cross-sectional contour of the cage pockets which is disposed longitudinally with respect to the circumferential direction are disposed only slightly above the top side of the bearing cage in a manner which is advantageous for the rest of the method.

After the swiveling of the ball rollers into the horizontal position described, there then follows, as the fourth assembly step, the fitting of the outer bearing race and the inner bearing race with the bearing cage and the ball rollers one inside the other in a position of the bearing races in which said races are turned at least approximately by 90° relative to one another and, as the fifth assembly step, the swiveling of the outer bearing race and the inner bearing race with the bearing cage and the ball rollers relative to one another about their common bearing transverse axis until both bearing races are disposed coaxially with respect to one another.

In the case of a ball roller bearing with an equal raceway groove depth in the outer and the inner bearing race, these method steps take place concretely, in accordance with an additional embodiment, such that, first of all, the outer bearing race is fixed in a vertical position in an auxiliary device, and then the inner hearing race together with the bearing cage and the ball rollers is inserted in a horizontal position in the outer bearing race. This means that the inner bearing race with the bearing cage and the ball rollers is pushed in a straight line into the outer bearing race in a crosswise position relative to the outer bearing race, and, according to a further embodiment, initially only two diametrically opposite ball rollers make contact with the raceway of the outer bearing race. To prepare the outer bearing race and the inner bearing race to be swiveled relative to one another, the ball rollers disposed on one side and the other side of the outer bearing race are then tipped in opposite directions in such a way that they are tilted within the raceway of the inner bearing race into an oblique position relative to one of the side faces of the inner bearing race. In the described position of the bearing races relative to one another, this means that the ball rollers are tilted obliquely toward the left-hand or right-hand side face of the inner bearing race and, according to still another embodiment, the tipped ball rollers are then disposed approximately at the level of the top side of the bearing cage on their lowered side. This is then followed by swiveling of the inner bearing race together with the bearing cage and the ball rollers relative to the outer bearing race, with the side faces of the inner bearing race, with respect to which the ball rollers are tilted, each being disposed in the lead in the swiveling direction. Before the inner bearing race with the bearing cage and the ball rollers is finally plunged into the outer bearing race, a slight radial offset of the inner bearing race relative to the outer bearing race is produced in order to facilitate swiveling that part of the inner bearing race which is opposite the direction of offset, together with the bearing cage and the ball rollers, into the outer bearing race. According to an additional further embodiment, this radial offset is accomplished by slightly raising the inner bearing race in the direction of one of the parts of the inner bearing race which is still situated outside the outer bearing race, i.e. preferably upward, in order to swivel the lower part of the inner bearing race into the outer bearing race. To enable the remaining part of the inner bearing race, together with the bearing cage and the ball rollers, also to be swiveled into the outer bearing race, that part of the inner bearing race which has already been swiveled in is lowered into the outer bearing race, with the result that this assembly step is also made easier. According to yet another embodiment, that part of the inner bearing race which has already been swiveled in is lowered into the outer bearing race in the direction opposite to that of that part of the inner bearing race which is not yet in the end position, i.e. preferably downward, in order ultimately also to swivel the upper part of the inner bearing race into the outer hearing race.

In the case of a ball roller bearing with different groove depths in the bearing races or with a smaller raceway groove depth in the outer bearing race and a greater raceway groove depth in the inner bearing race, however, method steps 4 and 5 can be carried out in a significantly simpler way in that, first the inner bearing race with the bearing cage and the ball rollers is fixed in a horizontal position in an auxiliary device, and then the outer bearing race is pushed in a vertical position onto the inner bearing race. Just as in the variant described above, it is also the case here, in accordance with another embodiment, that initially only two diametrically opposite ball rollers make contact with the raceway of the outer bearing race. This is then likewise followed by the tipping of the ball rollers disposed on one side and the other side of the outer bearing race in opposite directions such that said rollers are tilted within the raceway of the inner bearing race into an oblique position relative to one of the side faces of the inner bearing race, in this variant of the position of the bearing races relative to one another, however, this means that the ball rollers are tilted obliquely relative to the upper and the lower side face of the inner bearing race and in accordance with another embodiment, the tipped ball rollers are then once again disposed approximately at the level of the top side of the bearing cage on their lowered side. This is then followed by the swiveling of the outer bearing race relative to the inner bearing race with the bearing cage and the ball rollers in the direction of the lowered sides of the tipped ball rollers, with the different raceway groove depths in the bearing races allowing this swiveling to be carried out in a continuous working step without a temporary radial offset between the bearing races and without the ball rollers jamming in the raceway of the inner bearing race.

Irrespective of the respective embodiment of method steps 4 and 5, a rotary motion is then imparted in a sixth assembly step to the outer or the inner bearing race or even to both of the bearing races of the ball roller bearing, which is already assembled but still has horizontally disposed ball rollers in its raceways, or it (they) is (are) accelerated at a rotational speed such that the ball rollers automatically right themselves into the operating position thereof within the raceways of the bearing races through rotating on themselves and through centrifugal force. This is possible because, in accordance with a further embodiment, while a rotary motion is being imparted to the outer bearing race, the ball rollers are in contact by means of the boundary zones of their bearing surfaces with the boundary zones of the raceways of their bearing races and thus participate in the acceleration through frictional contact with the bearing races. The completion of the righting effect produced on the ball rollers can be observed from the ease of running of the ball roller bearing which ensues.

As a concluding seventh assembly step, the cage rims of the bearing cage are then flanged in the direction of the side faces of the ball rollers in order in this way to provide the already described axial guidance for the ball rollers for the purpose of avoiding the transverse wobbling effect described in certain operating states, and optional greasing and/or sealing of the ball roller bearing as required or not required by the specific use.

BRIEF DESCRIPTION OF THE DRAWINGS

Preferred embodiments of the ball roller bearing designed in accordance with the invention and of the method according to the invention for assembling such a ball roller bearing are explained in greater detail below with reference to the attached drawings. In the drawings.

DETAILED DESCRIPTION OF THE DRAWINGS

Figure 2:
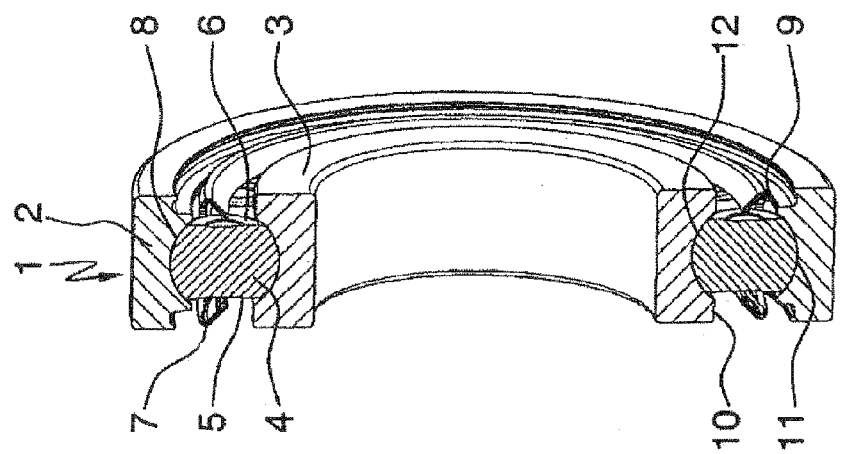
FIG. 2 shows a three-dimensional cross section through the first embodiment of the ball roller bearing shown in FIG. 1 and designed in accordance with the invention.
Figure 1:
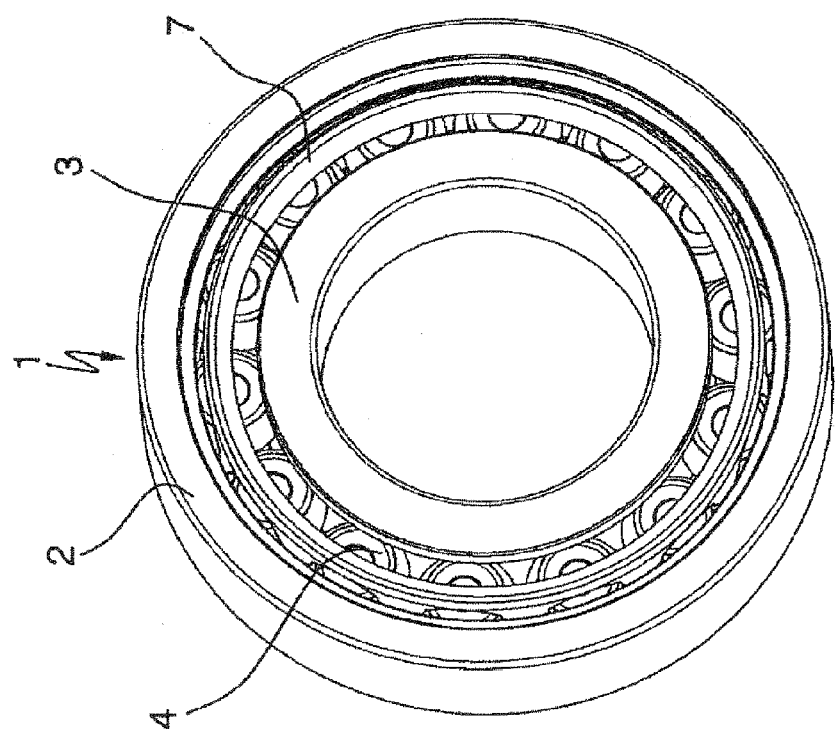
FIG. 1 shows an enlarged three-dimensional representation of a plan view of a first embodiment of a ball roller bearing designed in accordance with the invention.

FIGS. 1 and 2 show two different views of a single-row ball roller bearing 1, which consists essentially of an outer bearing race 2 and an inner bearing race 3, and of a multiplicity of ball rollers 4, which are disposed in a row between these bearing races 2, 3, which each have two side faces 5, 6 that are flattened symmetrically as a departure from a basic ball shape and are disposed parallel to one another, and which are held at uniform distances from one another in the circumferential direction by a bearing cage 7. It is apparent from FIGS. 3 and 4 that these ball rollers 4 have between the side faces 5, 6 thereof a width $b_k$ of approximately 70% of the diameter $d_K$ of the basic ball shape thereof, and roll with the bearing surfaces 8 thereof in two groove-shaped raceways 11, 12, which are machined into the inside 9 of the outer bearing race 2 and into the outside 10 of the inner bearing race 3 and the depth $t_{LA}$, $t_{LI}$ of which is dimensioned in such a way that the distance $a_L$ between the inside 9 of the outer bearing race 2 and the outside 10 of the inner bearing race 3 is less than the width $b_K$ of the ball rollers 4.

Figure 3:
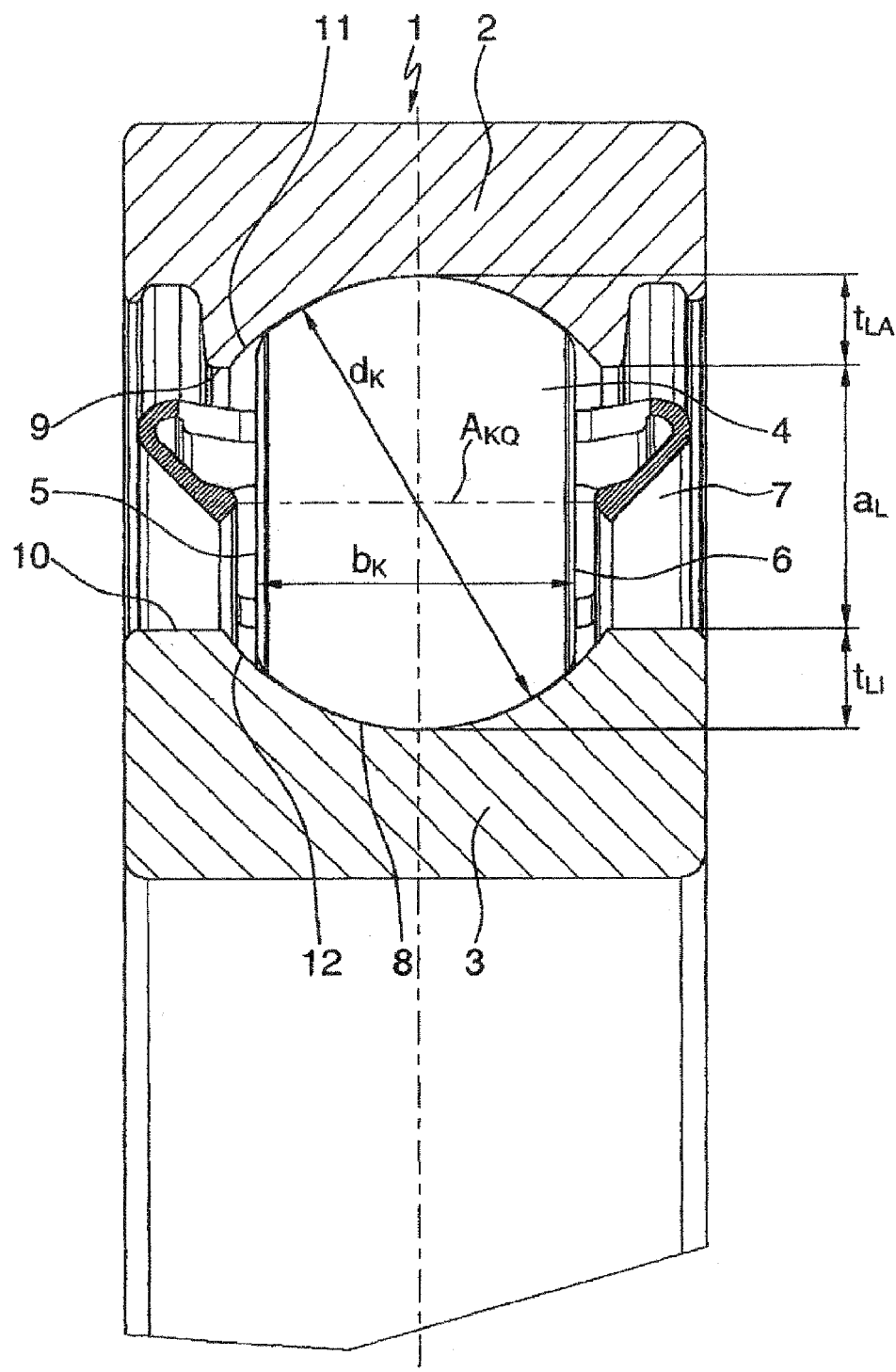
FIG. 3 shows an enlarged representation of the upper half of the cross section through the first embodiment of the ball roller bearing according to the invention shown in FIG. 2.
Figure 4:
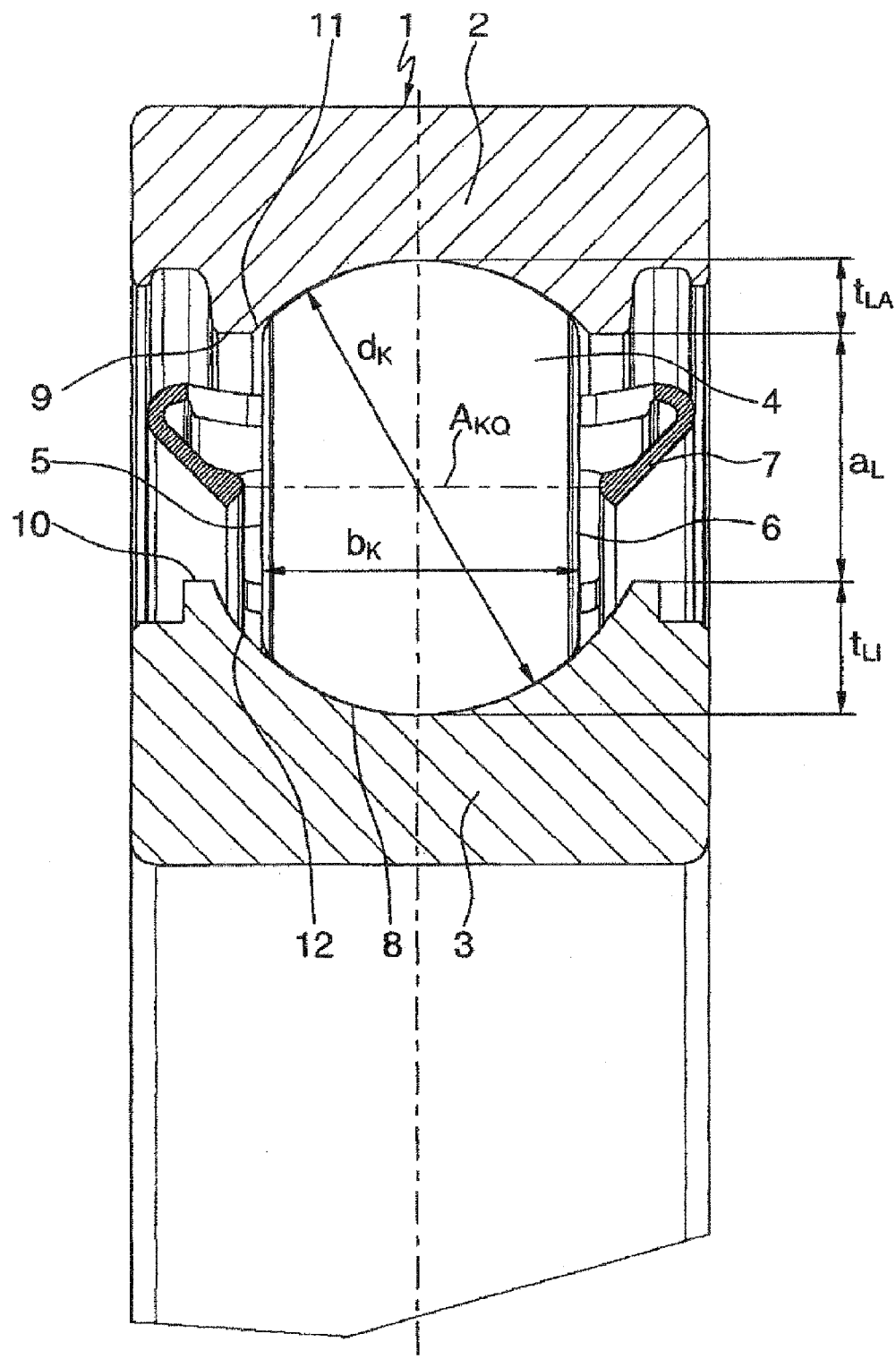
FIG. 4 shows an enlarged representation of the upper half of the cross section through a second embodiment of a ball roller bearing according to the invention.
Figure 5:
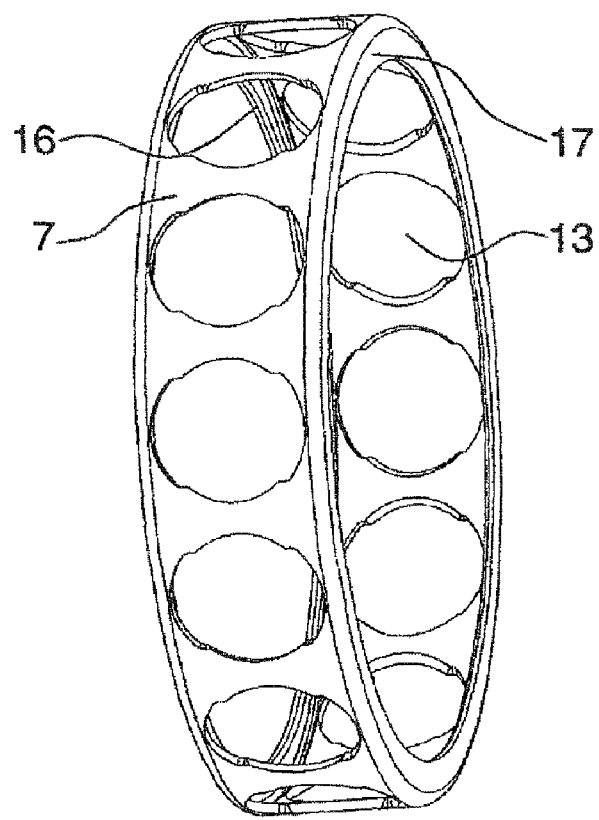
FIG. 5 shows a three-dimensional overall representation of the bearing cage of the embodiments shown in FIGS. 3 and 4 of a ball roller bearing designed in accordance with the invention.
Figure 6:
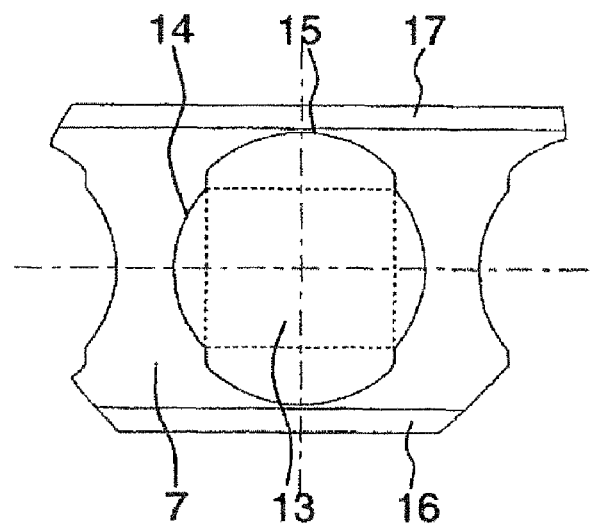
FIG. 6 shows an enlarged representation of a cage pocket of the bearing cage of the embodiments shown in FIGS. 3 and 4 of a ball roller bearing designed in accordance with the invention.

The significant innovation in the ball roller bearing 1 illustrated consists in that the bearing cage 7 thereof (depicted once again in isolation in FIG. 5) is designed as a window cage, the individual cage pockets 13 of which, as indicated by dashed reference lines in FIG. 6, each have the integrated overall contour of a cross-sectional contour 14, 15 of a ball roller 4 disposed in the longitudinal and transverse directions relative to the circumferential direction and are disposed spaced apart in such a way that the sum of the distances between the introduced ball rollers 4 at the pitch circle thereof is less than the diameter $d_K$ of the basic ball shape of one individual ball roller 4. Moreover, the ball roller bearing 1 according to the invention is distinguished by the fact that the depth $t_{LA}$, $t_{LI}$ of the groove-shaped raceways 11, 12 is either the same in both bearing races 2, 3 and is about 17% to 25% of the diameter $d_K$ of the basic ball shape of the ball rollers 4, as illustrated in FIG. 3, or the depth $t_{LA}$, $t_{LI}$ of the groove-shaped raceways 11, 12 is different in the two bearing races 2, 3 and is about 17% in the outer bearing race 2 and up to 30% in the inner bearing race 3 of the diameter $d_K$ of the basic ball shape of the ball rollers 4, as indicated in FIG. 4. Both embodiments of the groove depths of the raceways 11, 12 ensure a high degree of osculation between the ball rollers 4 and the raceways 11, 12 thereof, even when there is a permissible skewing of the ball roller bearing 1 out of the center position, but allow different embodiments of the method for assembling the ball roller bearing 1, as will be described below.

From FIGS. 5 and 6, it is furthermore apparent that the cross-sectional contour 14 of the cage pockets 13 of the bearing cage 7 which is disposed longitudinally with respect to the circumferential direction in each case has the shape of a section plane disposed above the transverse axis $A_{KQ}$ of a ball roller 4, while the cross-sectional contour 15 of the cage pockets 13 which is disposed transversely to the circumferential direction is made somewhat longer and in each case corresponds to the shape of a section plane disposed directly on the transverse axis $A_{KQ}$ of a ball roller 4. Here, the cross-sectional contour 15 of the cage pockets 13 which is disposed transversely to the circumferential direction is critical for the execution of the assembly method described below and, unlike the cross-sectional contour 14 of the cage pockets 13 which is disposed longitudinally with respect to the circumferential direction, does not contribute to guidance of the rolling elements after assembly of the bearing.

It is likewise evident from FIGS. 5 and 6, that, as depicted, the bearing cage 7 initially has a U-shaped profile cross section, the lateral profile webs of which are provided as cage rims 16, 17 for the purpose of avoiding transverse wobbling of the ball rollers 4. These cage rims 16, 17 have a length such that, after inward flanging toward the ball rollers 4, which concludes the assembly of the bearing, they have the shape depicted in FIGS. 3 and 4, in which the end edges thereof are disposed approximately at the level of the pitch circle of the ball roller bearing 1. Here, the starting material for such a bearing cage 7 is a sheet metal strip, from which the bearing cage 7 is produced without machining by profiling the cage rims 16, 17, punching the cage pockets 13, cutting to length to give the dimension of the circumference of the bearing cage 7, rolling into a ring and welding the ends of the ring. The cage pockets 13 of the bearing cage 7, which with their special shape are disposed spaced apart, make it possible here for the assembled ball roller bearing 1 to have a rolling element filling ratio of about 85% to 95%, in contrast to deep groove ball bearings of the same construction or other known ball roller bearings, with the result that its radial loading capacity is many times higher and its life is about 180% to 240%, based on 100% for the life of a deep groove ball bearing of the same construction.

In FIGS. 7 to 21, two embodiments of the method for assembling the ball roller bearing 1 designed in accordance with the invention are furthermore represented graphically, said embodiments of the method being adapted to the embodiments of the ball roller bearing 1 in accordance with FIGS. 3 and 4. This method is designed as a "cross/oblique/swivel" assembly method, in which the bearing races 2, 3 are temporarily swiveled one inside the other in a crosswise position relative to one another together with the ball rollers 4, which are in an oblique position, and the bearing cage 7.

Figure 7:
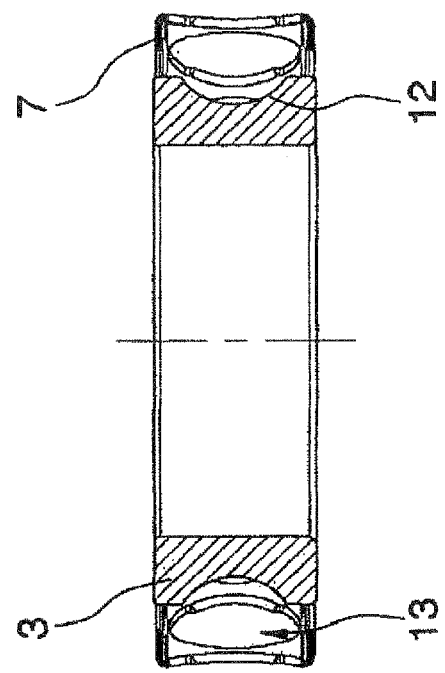
FIG. 7 shows a three-dimensional view and a cross section through the first embodiment of a ball roller bearing according to the invention after the first method step for the assembly thereof.
Figure 7:
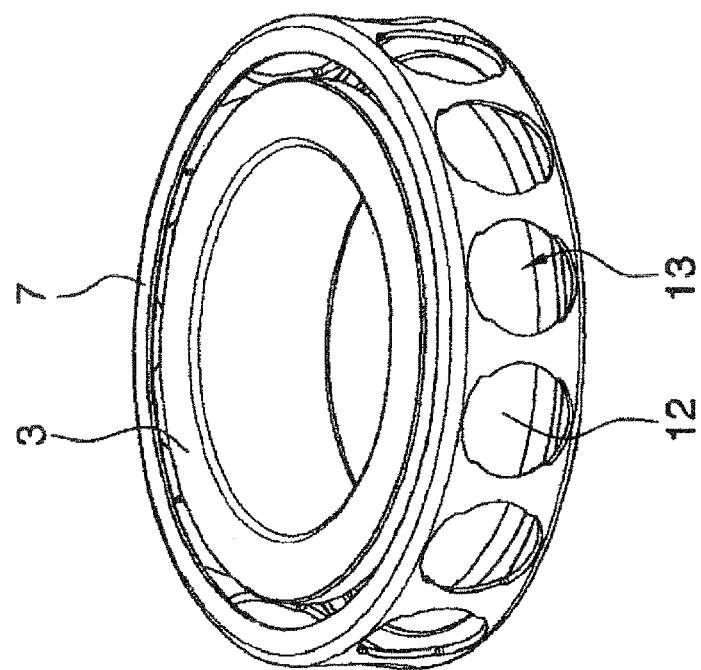

Irrespective of whether the bearing is embodied in accordance with FIG. 3 or 4, according to this procedure, the bearing assembly starts with a first assembly step, which is depicted by way of example in FIG. 7 using the embodiment in accordance with FIG. 3, in which the inner bearing race 3 and the bearing cage 7 of the ball roller bearing 1 are first arranged in a concentric position relative to one another in an at least approximately common plane.

Figure 8:
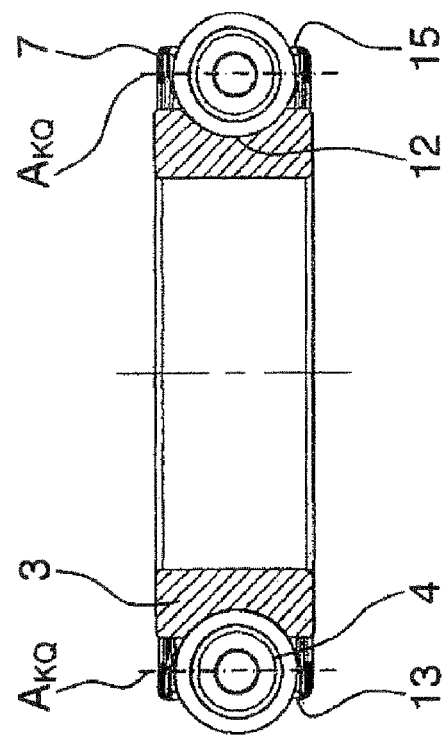
FIG. 8 shows a three-dimensional view and a cross section through the first embodiment of a ball roller bearing according to the invention after the second method step for the assembly thereof.
Figure 8:
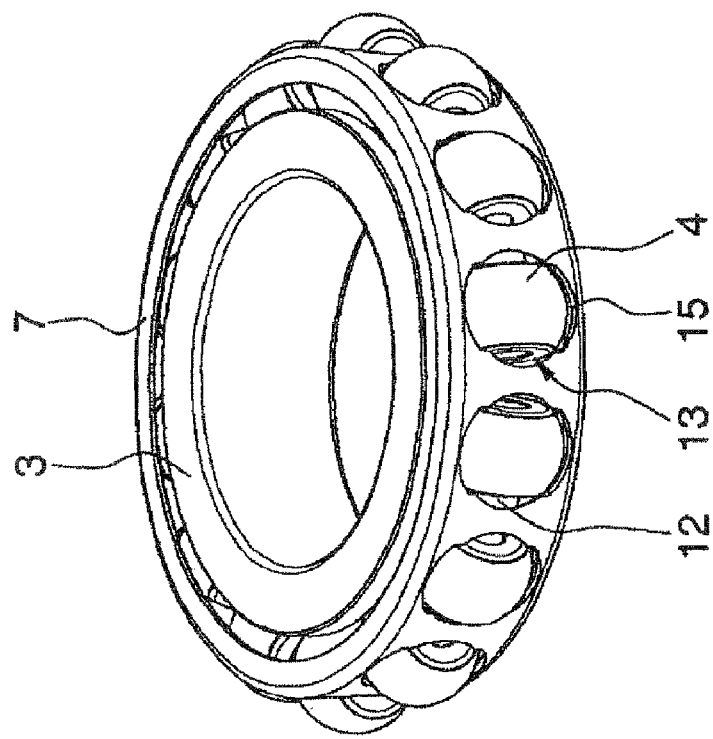

In the second assembly step, which is illustrated in FIG. 8, the ball rollers 4 are then inserted in a position turned by 90° relative to the operating position thereof through the cage pockets 13 of the bearing cage 7, into the raceway 12 of the inner bearing race 3, it being clearly apparent that this insertion of the ball rollers 4 is accomplished exclusively through the cross-sectional contour 15 of the cage pockets 13 which is disposed transversely to the circumferential direction.

Figure 9:
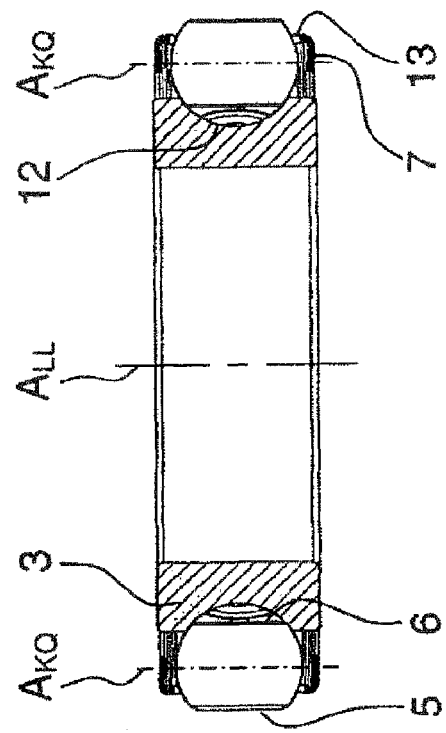
FIG. 9 shows a three-dimensional view and a cross section through the first embodiment of a ball roller bearing according to the invention after the third method step for the assembly thereof.
Figure 9:
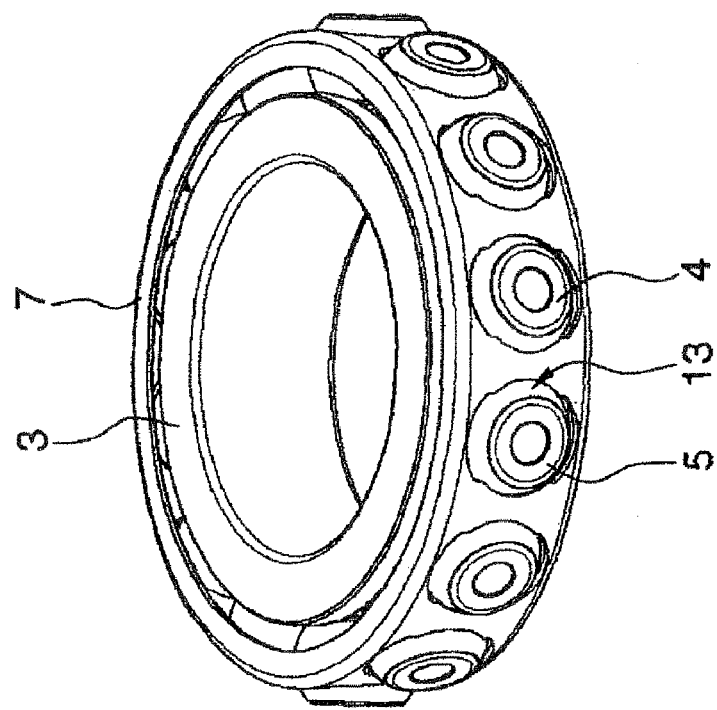

In a third assembly step, which is illustrated by FIG. 9, the ball rollers 4 are then swiveled by 90° about the transverse axes $A_{KQ}$ thereof within the cage pockets 13, into a horizontal position, such that the side faces 5, 6 thereof are disposed parallel to the bearing longitudinal axis $A_{LL}$ and that one of the side faces 5 or 6 thereof is directly in the raceway 12 of the inner bearing race 3, it being clearly apparent that the transverse axes $A_{KQ}$ of the ball rollers 4 are each disposed below the level of the underside of the bearing cage 7.

Figure 10:
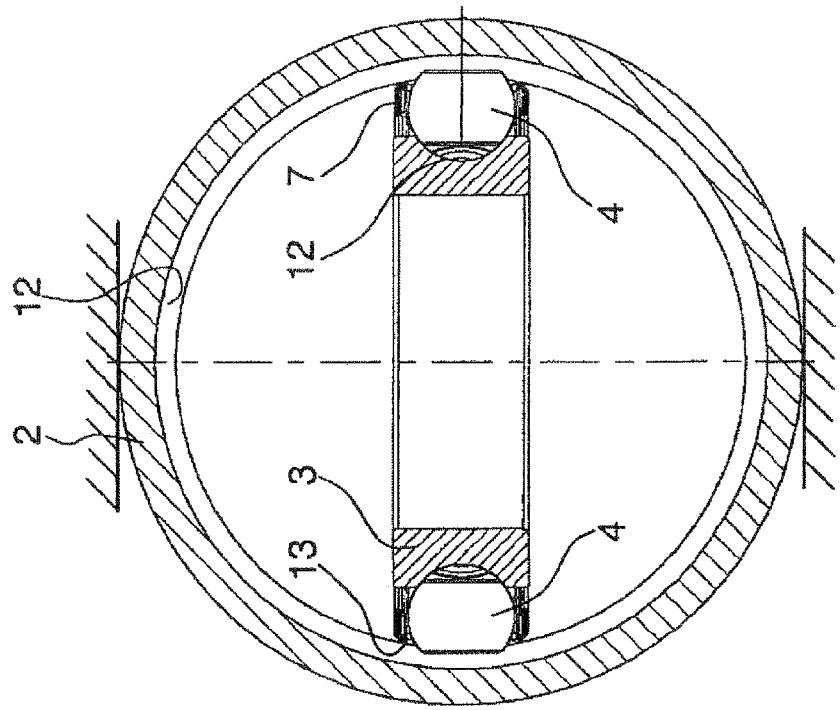
FIG. 10 shows a three-dimensional view and a cross section through the first embodiment of a ball roller bearing according to the invention after a first variant of the fourth method step for the assembly thereof.
Figure 10:
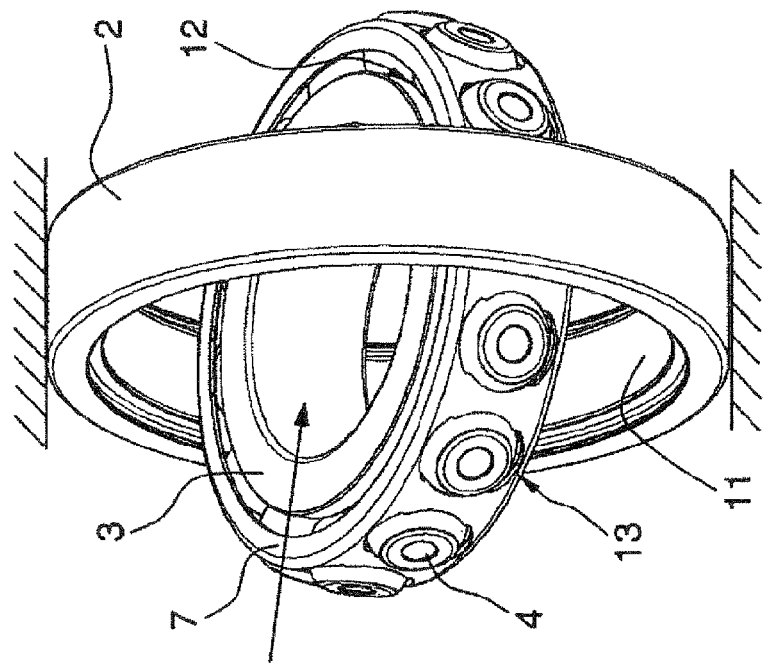

After the ball rollers 4 have been swiveled into the horizontal position thereof, the outer bearing race 2 and the inner bearing race 3 with the bearing cage 7 and the ball rollers 4 are, as the fourth assembly step, fitted one inside the other in a position of the bearing races 2, 3 in which said races are turned or crossed at least approximately by 90° relative to one another. As a first preparatory step for a first variant of this method step, which is suitable specifically for the first embodiment of the ball roller bearing 1 shown in FIG. 3, the outer bearing race 2 is first of all fixed in a vertical position in an auxiliary device (not shown specifically), as depicted in FIG. 10, and the inner bearing race 3 together with the bearing cage 7 and the ball rollers 4 is inserted in a horizontal position into the outer bearing race 2, as indicated by the movement arrow. The associated sectional representation in FIG. 10 makes clear that initially only two diametrically opposite ball rollers 4 make contact with the raceway 11 of the outer bearing race 2.

Figure 11:
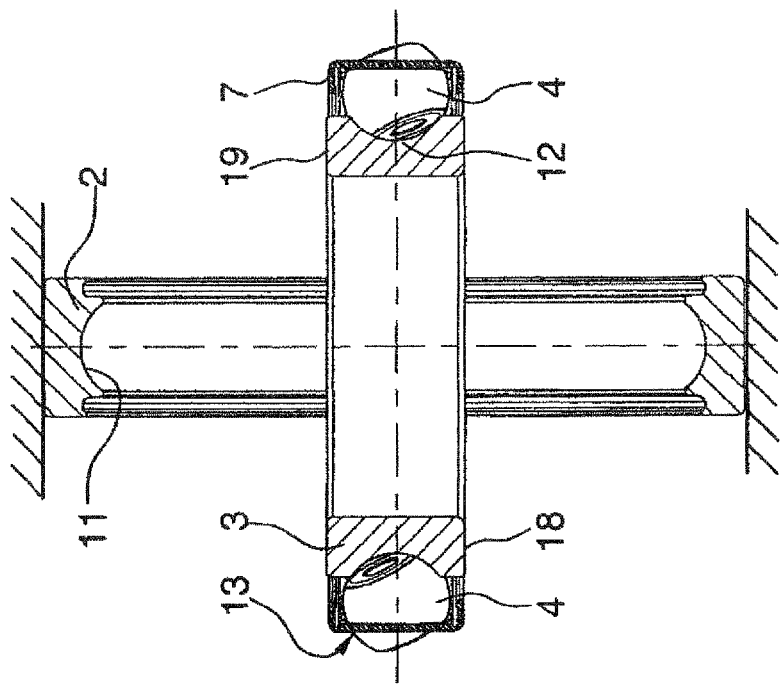
FIG. 11 shows a three-dimensional view and a cross section through the first embodiment of a ball roller bearing according to the invention after a first intermediate step of the first variant of the fourth method step for the assembly thereof.
Figure 11:
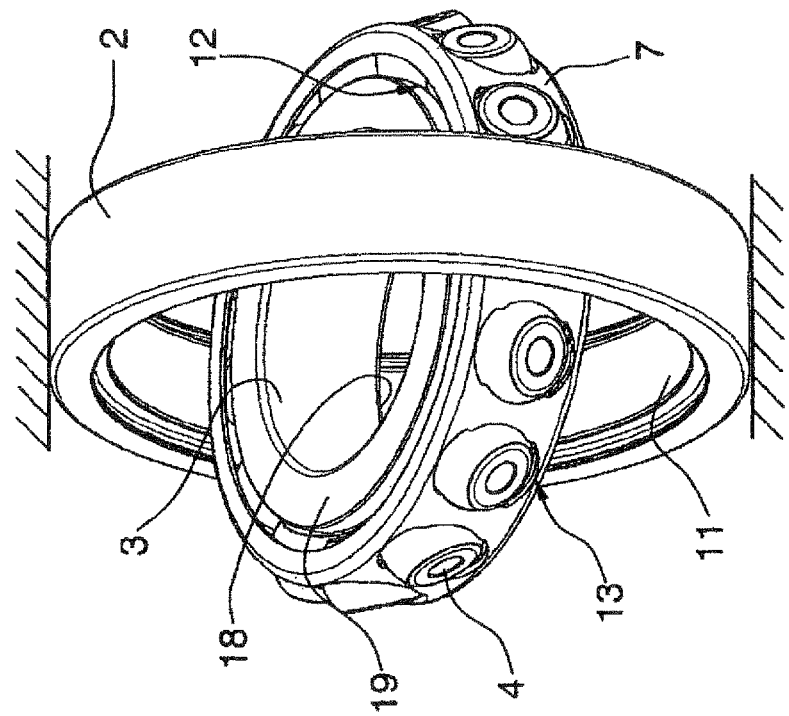

As a second preparatory step for the first variant of the fourth assembly step, the ball rollers 4 disposed on one side and the other side of the outer bearing race 2 are then tipped in opposite directions, as illustrated in FIG. 11, in such a way that they are in each case tilted opposite to one of the side faces 18, 19 of the inner bearing race 3 within the raceway 12 of the inner bearing race 3, into an obliquely tilted position, and are then disposed approximately at the level of the top side of the bearing cage 7 on their lowered side. As is clearly apparent, the oblique tilting of the ball rollers 4 takes place relative to the lower side face 18 of the inner bearing race 3 in that half of the inner bearing race 3 which is disposed on the left of the outer bearing race 2 and takes place relative to the upper side face 19 of the inner bearing race 3 in that half of the inner bearing race 3 which is disposed on the right of the outer bearing race 2.

Figure 12:
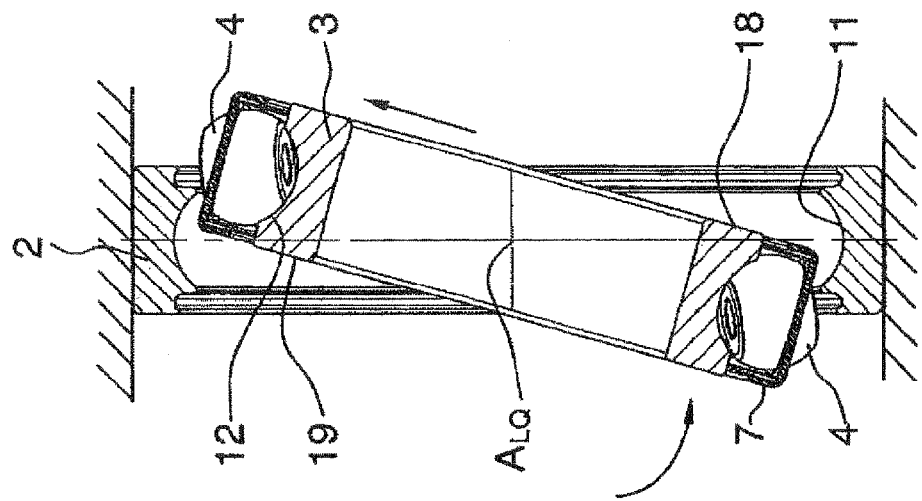
FIG. 12 shows a three-dimensional view and a cross section through the first embodiment of a ball roller bearing according to the invention after a first intermediate step of a first variant of the fifth method step for the assembly thereof.
Figure 12:
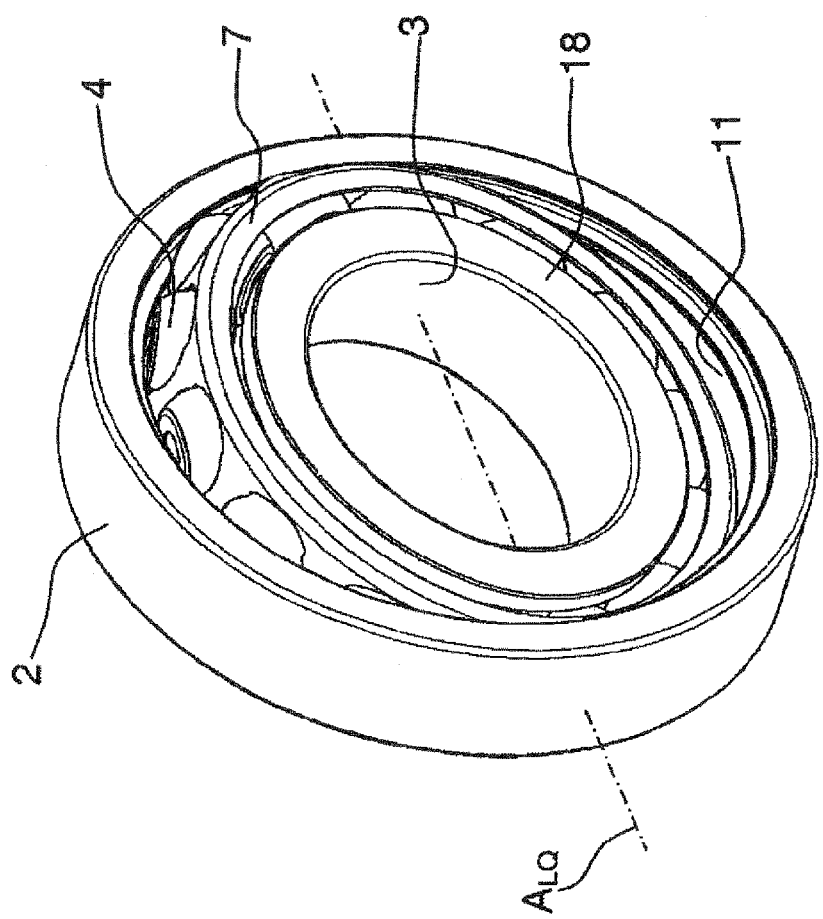

As method step five, the outer bearing race 2 and the inner bearing race 3 with the bearing cage 7 and the ball rollers 4 are swiveled relative to one another about their common bearing transverse axis $A_{LQ}$ until both bearing races 2, 3 are disposed coaxially with respect to one another. In a variant of this method step, which is suitable specifically for the first embodiment of the ball roller bearing 1 shown in FIG. 3, this method step is accomplished by swiveling the inner bearing race 3 together with the bearing cage 7 and the ball rollers 4 relative to the outer bearing race 2 about their common bearing transverse axis $A_{LQ}$, as illustrated in FIG. 12, with the side faces 18, 19 of the inner bearing race 3, with respect to which the ball rollers 4 are tilted, each facing in the direction of swiveling. This is followed by the production of a slight radial offset of the inner bearing race 3 relative to the outer bearing race 2 by raising the inner bearing race 3 in order to facilitate the swiveling in of the lower part of the inner bearing race 3, that part opposite the direction of offset, together with the bearing cage 7 and the ball rollers 4, into the outer bearing race 2, as indicated in the drawing by movement arrows. In a further partial step illustrated by FIG. 13, which is intended to enable the remaining, upper part of the inner bearing race 3, together with the bearing cage 7 and the ball rollers 4, to be swiveled more easily into the outer bearing race 2, the lower part of the inner bearing race 3, which has already been swiveled in, is then first of all lowered into the outer bearing race 2 in accordance with the movement arrows in the drawing, and the ball roller bearing 1 is therefore fully assembled but still has horizontally disposed ball rollers 4.

Figure 14:
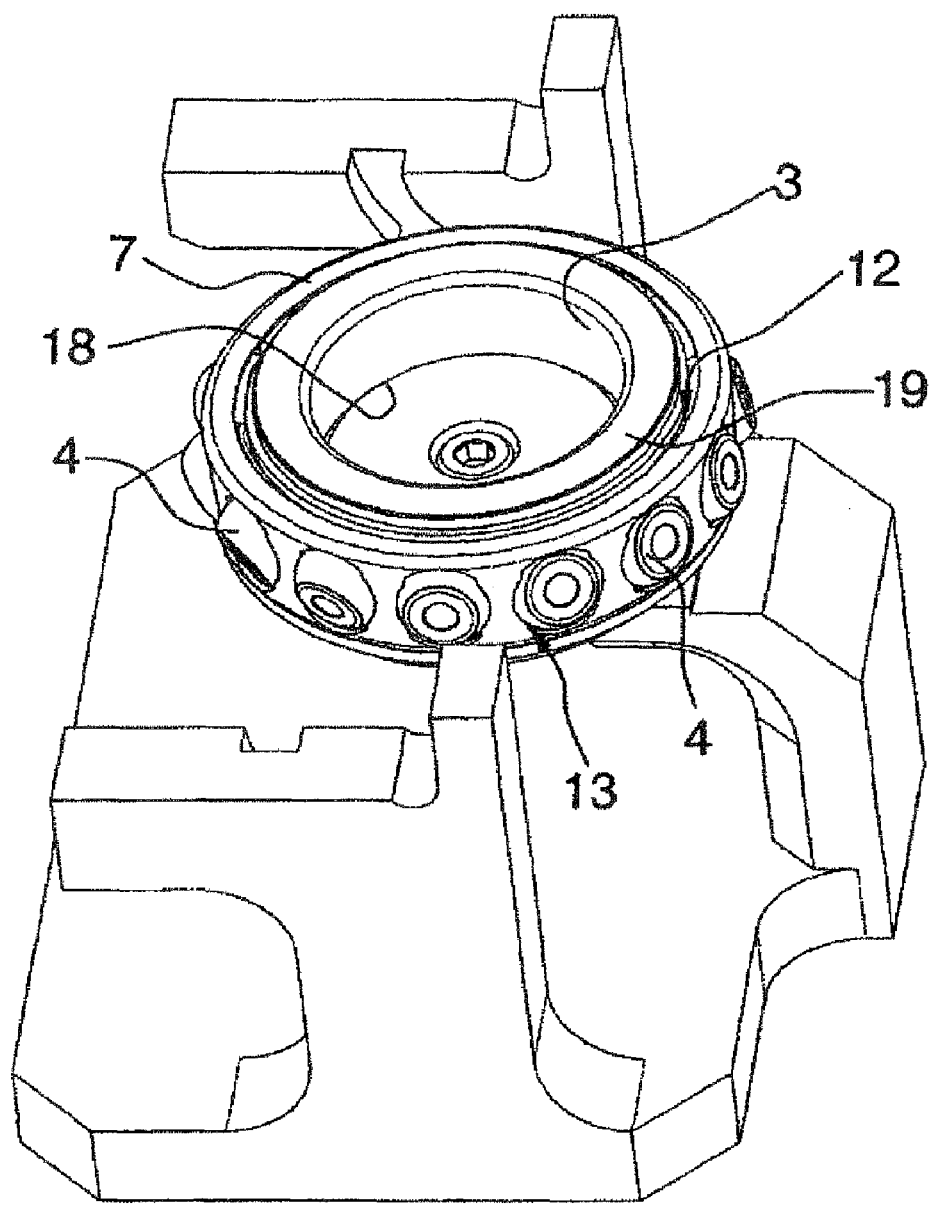
FIG. 14 shows a three-dimensional view of the second embodiment of a ball roller bearing according to the invention after two first preparatory steps of a second variant of the fourth method step for the assembly thereof.
Figure 15:
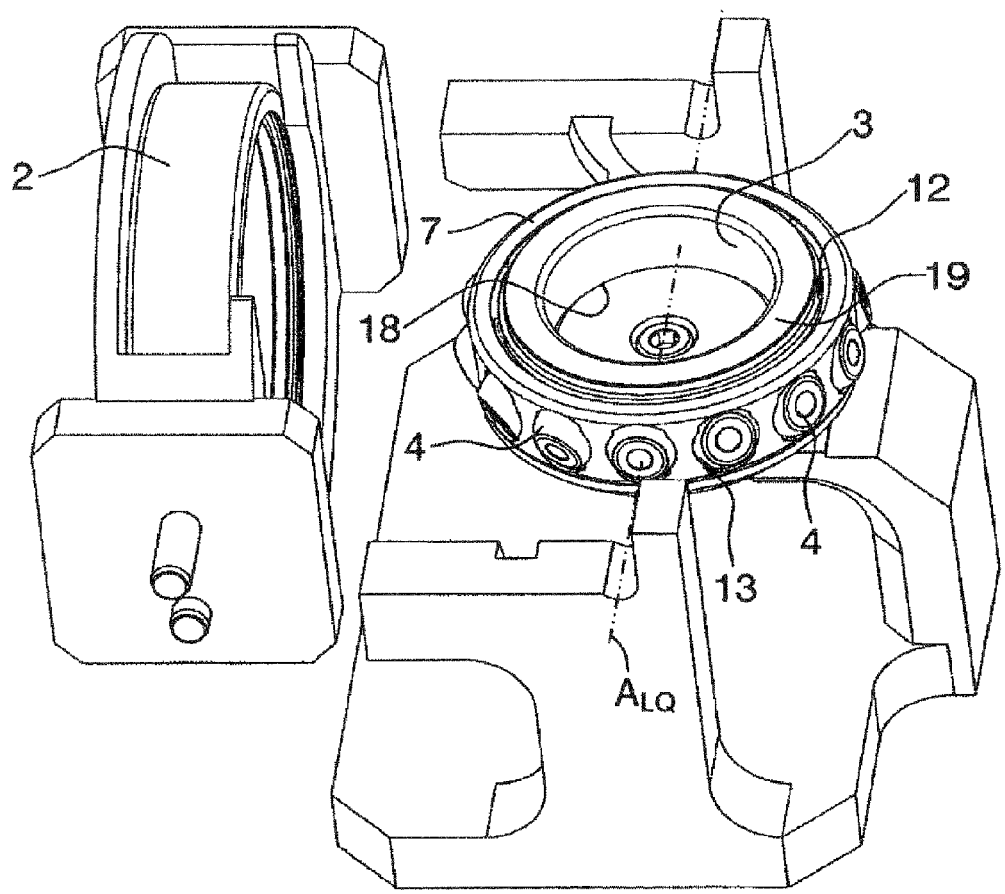
FIG. 15 shows a three-dimensional view of the second embodiment of a ball roller bearing according to the invention before the second variant of the fourth method step for the assembly thereof is carried out.
Figure 16:
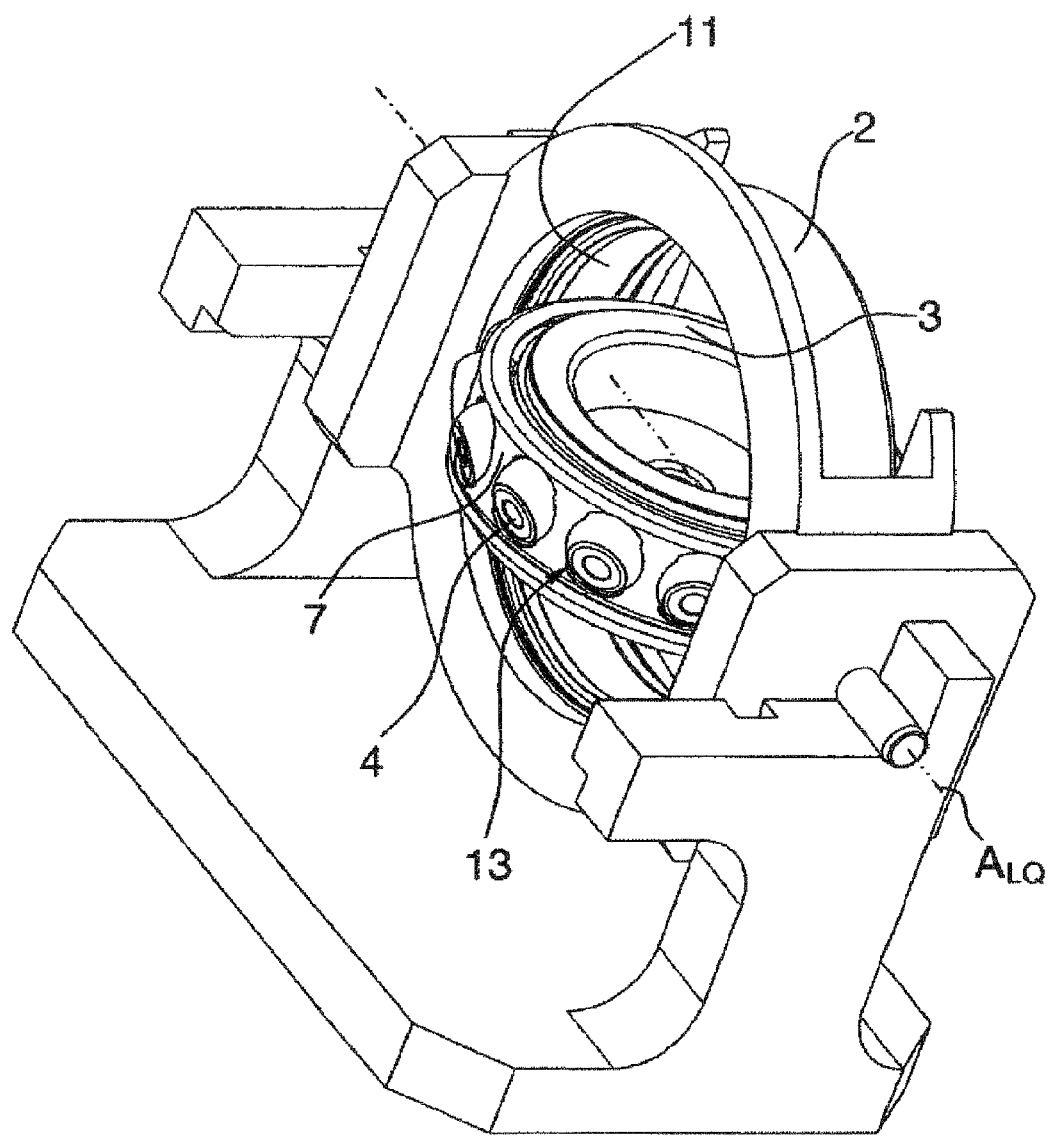
FIG. 16 shows a three-dimensional view of the second embodiment of a ball roller bearing according to the invention after the second variant of the fourth method step for the assembly thereof has been carried out.

In a second variant of the fourth method step, which is suitable specifically for the second embodiment of the ball roller bearing 1 shown in FIG. 4, the first preparatory step for fitting the outer bearing race 2 and the inner bearing race 3 with the bearing cage 7 and the ball rollers 4 into one another, is by contrast the fixing of the inner bearing race 3 with the bearing cage 7 and the ball roller 4 in a horizontal position in an auxiliary device (not shown specifically), as depicted in FIG. 14, and the second preparatory step is the tipping of the ball rollers 4 disposed on one side and the other side of the outer bearing race 2, which is subsequently to be pushed on, in opposite directions within the raceway 12 of the inner bearing race 3 into an obliquely tilted position relative to one of the side faces 18, 19 of the inner bearing race 3. As indicated in FIG. 15, the outer bearing race 2 is then pushed in a vertical position onto the inner bearing race 3, and FIG. 16 makes it clear that, during this process, it is likewise the case that initially only two diametrically opposite ball rollers 4 make contact with the raceway 11 of the outer bearing race 2.

Figure 17:
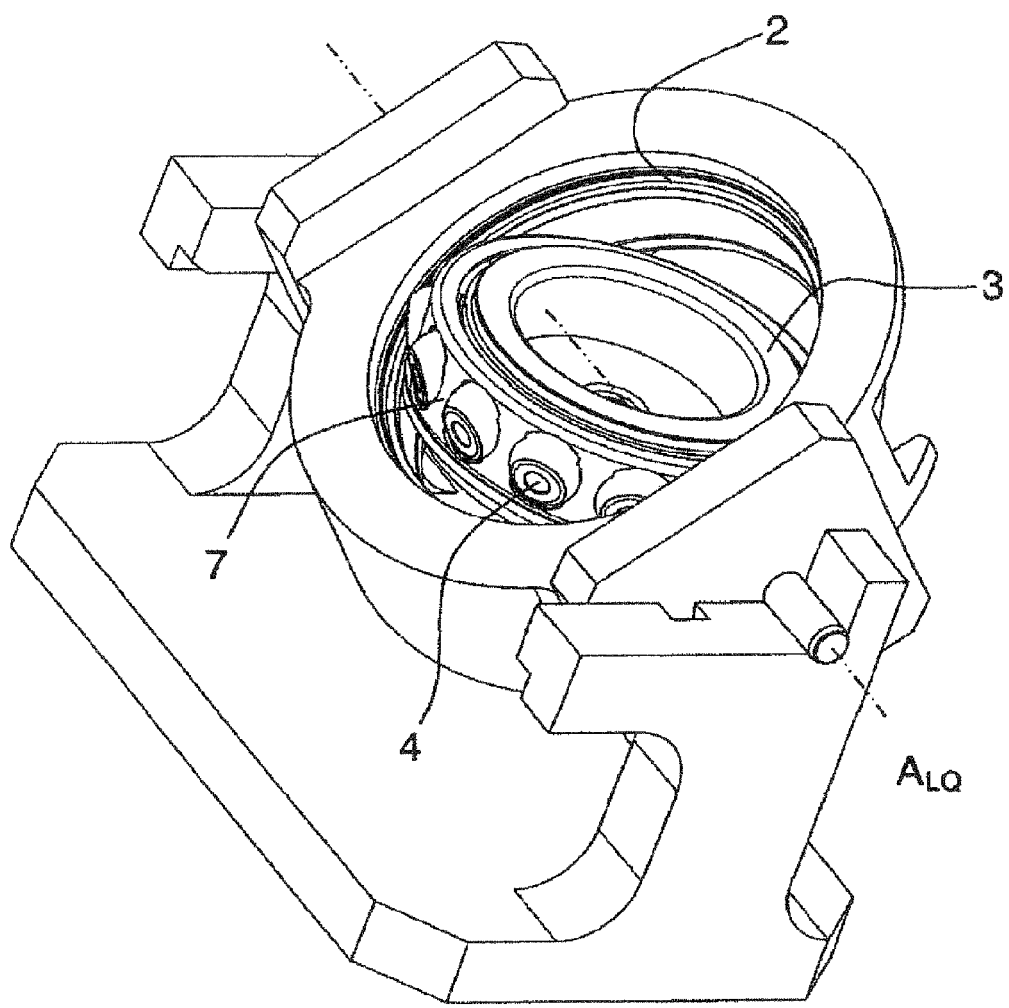
FIG. 17 shows a three-dimensional view of the second embodiment of a ball roller bearing according to the invention while a second variant of the fifth method step for the assembly thereof is being carried out.
Figure 18:
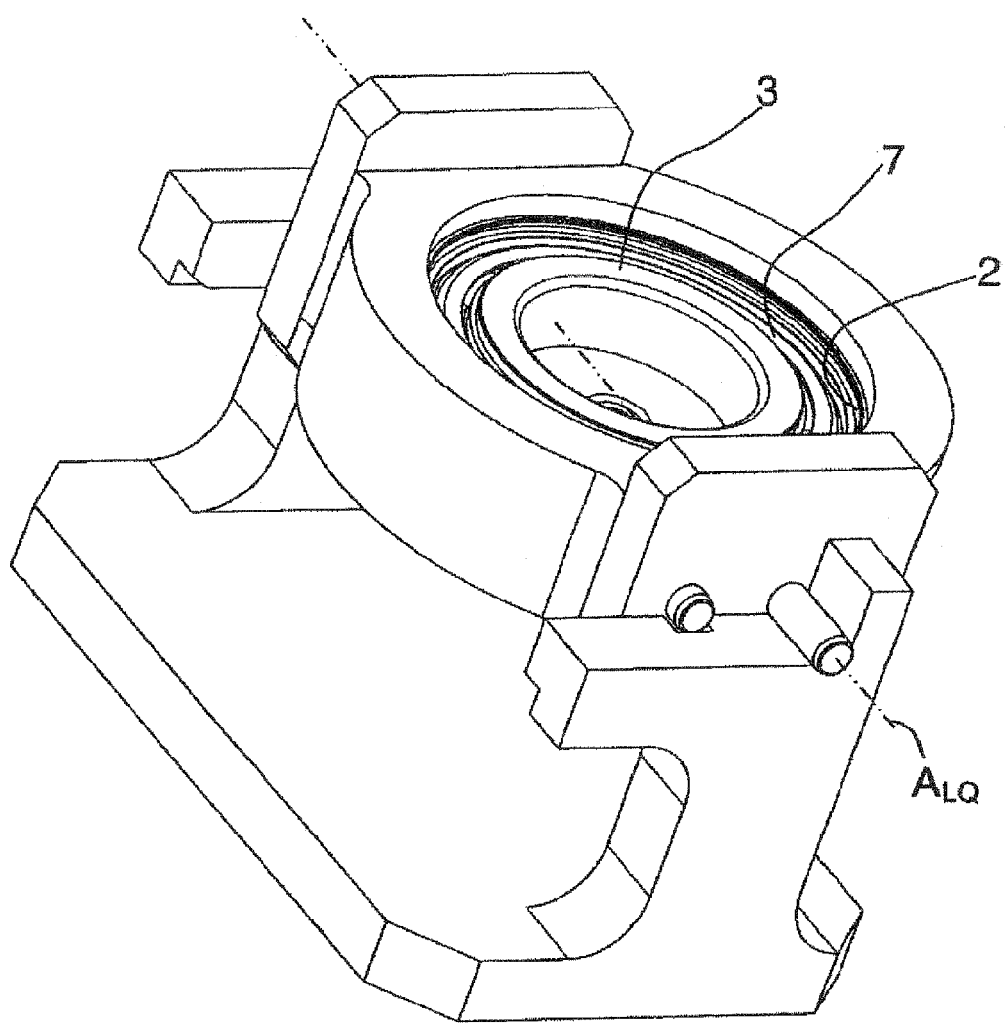
FIG. 18 shows a three-dimensional view of the second embodiment of a ball roller bearing according to the invention after the second variant of the fifth method step for the assembly thereof has been carried out.
Figure 19:
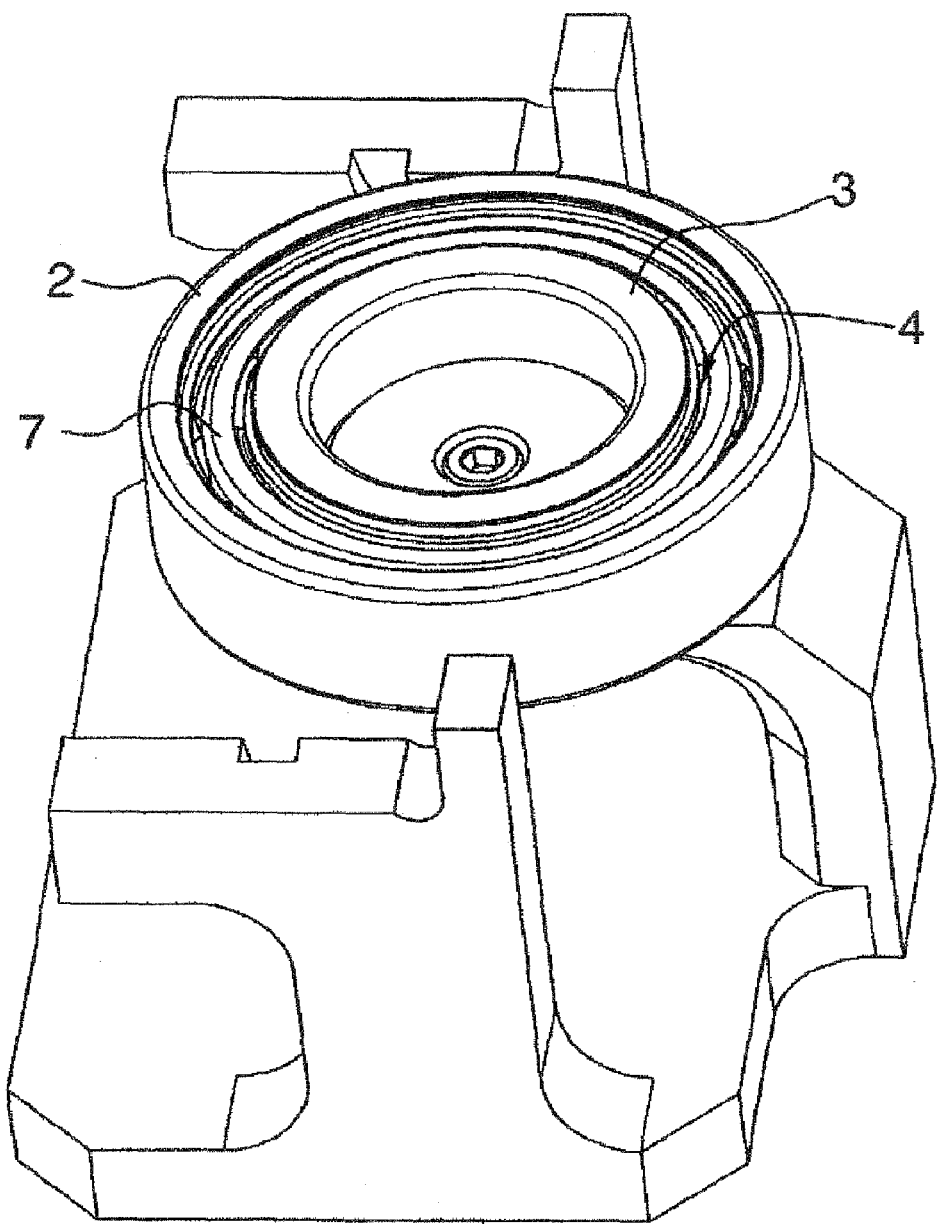
FIG. 19 shows a three-dimensional view of the second embodiment of a ball roller bearing according to the invention before the sixth method step for the assembly thereof.

FIG. 17 then illustrates the swiveling of the outer bearing race 2 and the inner bearing race 3 with the bearing cage 7 and the ball rollers 4 relative to one another about their common bearing transverse axis $A_{LQ}$ in accordance with the fifth method step, this being achieved, in the case of the second variant, which is suitable for the second embodiment of the ball roller bearing 1 shown in FIG. 4, by swiveling the outer bearing race 2 relative to the inner bearing race 3 with the bearing cage 7 and the ball rollers 4 in the direction of the lowered sides of the tipped ball rollers 4 without any radial offset between the bearing races 2, 3. As depicted in FIG. 18, the bearing races 2, 3 are then disposed coaxially with respect to one another, and the ball roller bearing 1 is therefore fully assembled but, as per the first variant of method steps four and five and as indicated in FIG. 19, likewise still has horizontally disposed ball rollers 4.

Figure 13:
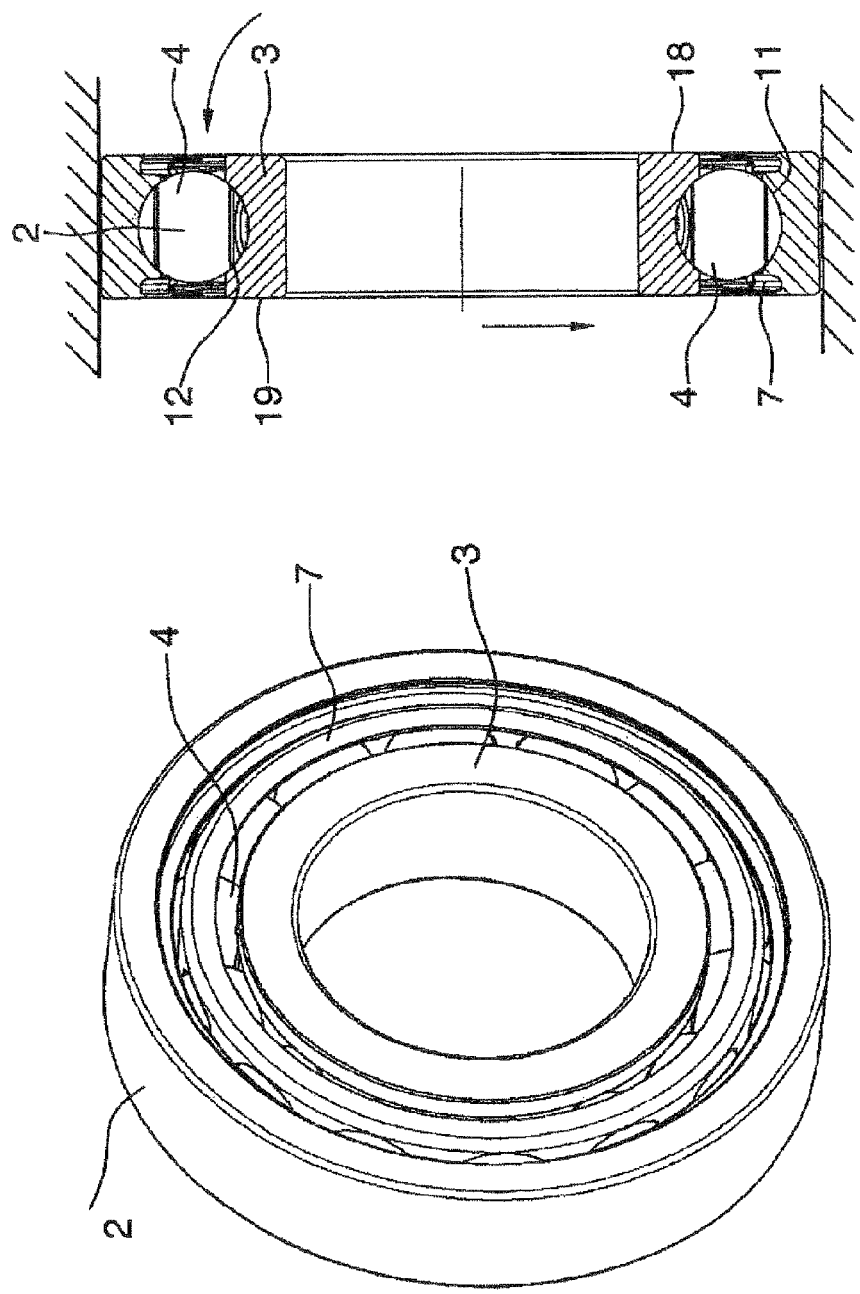
FIG. 13 shows a three-dimensional view and a cross section through the first embodiment of a ball roller bearing according to the invention before the sixth method step for the assembly thereof.
Figure 20:
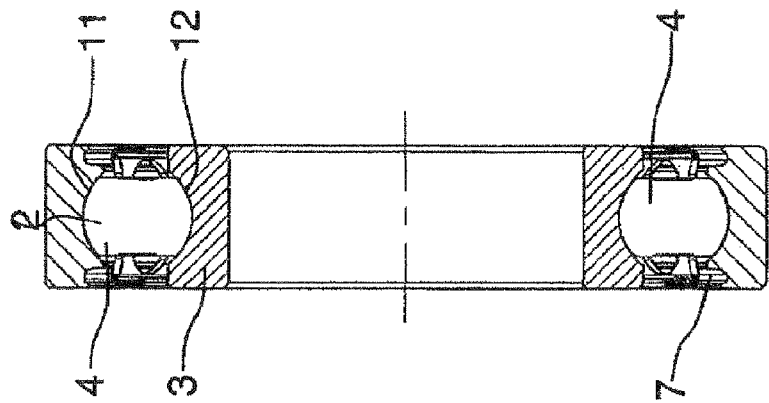
FIG. 20 shows a three-dimensional view and a cross section through the first embodiment of a ball roller bearing according to the invention after the sixth method step for the assembly thereof.
Figure 20:
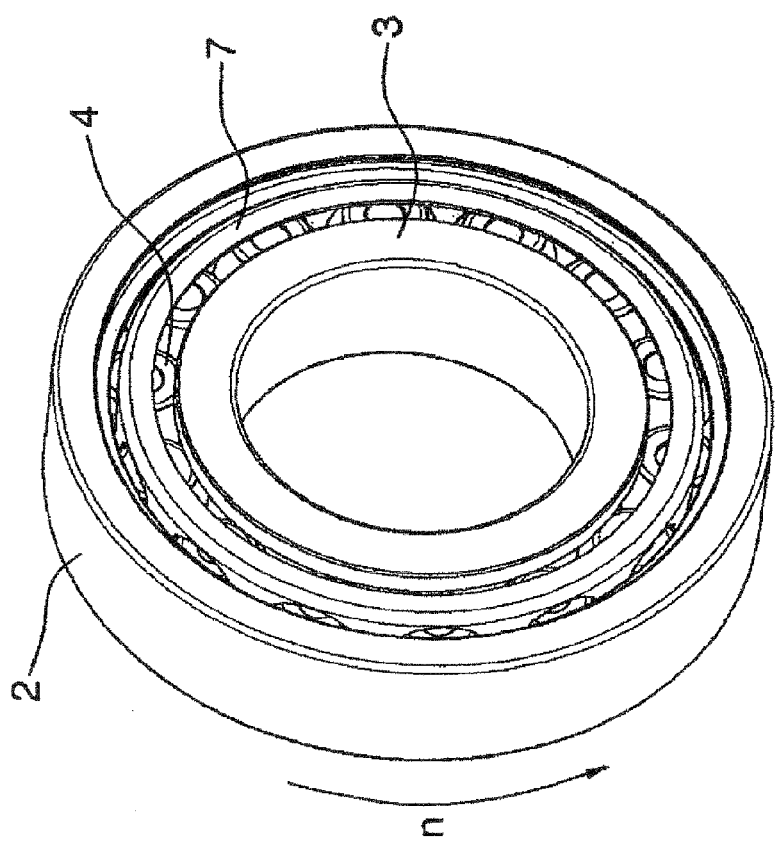

FIG. 20 in turn then shows the first embodiment of the ball roller bearing 1 according to the invention, as representing both embodiments, in a sixth assembly step, in which, as indicated by the movement arrow in the drawing, only the outer bearing race 2 of the ball roller bearing 1 has imparted to it a rotary motion or is accelerated at a rotational speed n such that the ball rollers 4 automatically right themselves into the operating position thereof within the raceways 11, 12 of the bearing races 2, 3 by rotating on themselves and through centrifugal force. This is possible because, after the fifth method step, as can be seen in FIGS. 13 and 19, the ball rollers 4 are in a horizontal position, in which they are in contact by means of the boundary zones of their bearing surfaces 8 with the boundary zones of the raceways 11, 12 of their bearing races 2, 3 and can thus be accelerated through frictional contact with the bearing races 2, 3.

Figure 21:
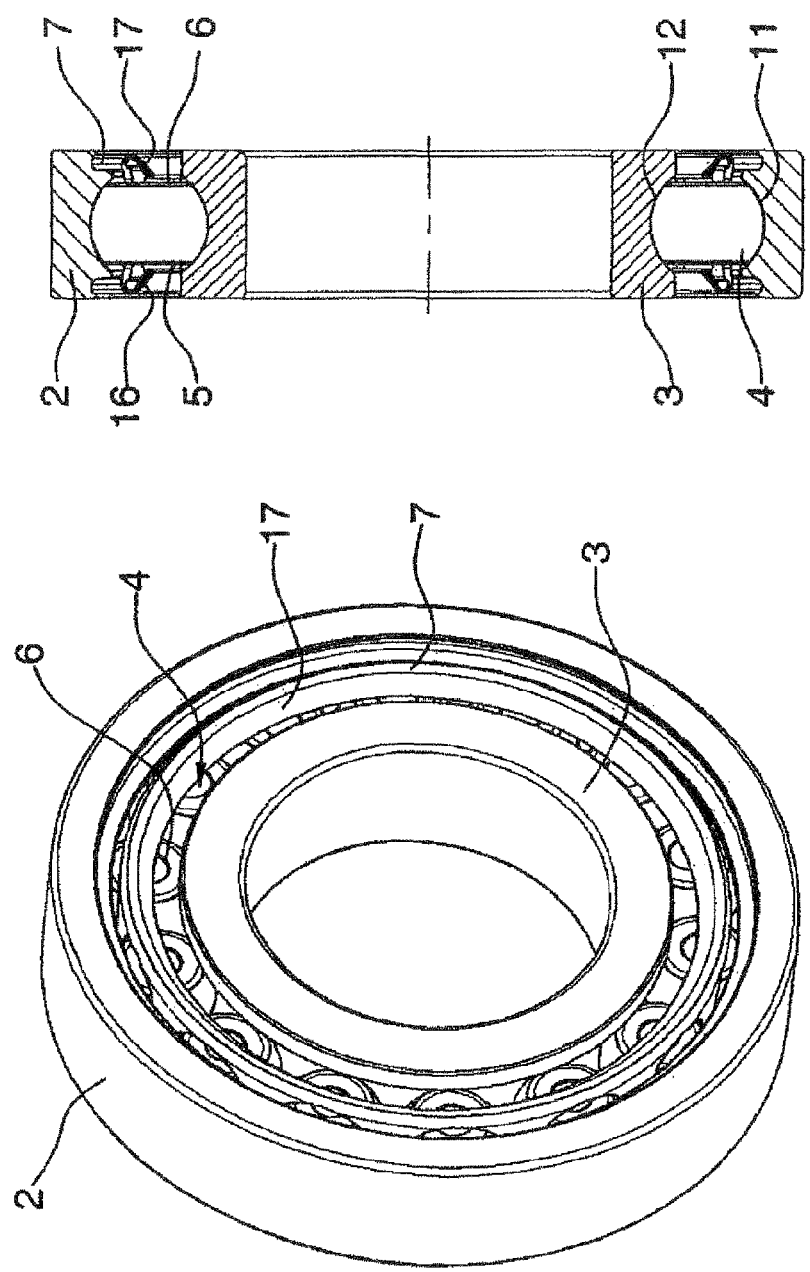
FIG. 21 shows a three-dimensional view and a cross section through the first embodiment of a ball roller bearing according to the invention after the seventh and last method step for the assembly thereof.

As a concluding, seventh assembly step, the cage rims 16, 17 of the bearing cage 7 are then flanged in the direction of the side faces 5, 6 of the ball rollers 4, as indicated in FIG. 21, in order in this way to provide axial guidance for the ball rollers 4 for the purpose of avoiding the transverse wobbling effect described in certain operating states, and greasing and sealing of the ball roller bearing 1 envisaged for the specific ball roller bearing 1 illustrated.

LIST OF REFERENCE SIGNS

1 Ball roller bearing
2 Outer bearing race
3 Inner bearing race
4 Ball rollers
5 Side face of 4
6 Side face of 4
7 Bearing cage
8 Bearing surfaces of 4
9 Inside of 2
10 Outside of 3
11 Raceway in 9
12 Raceway in 10
13 Cage pockets
14 Cross-sectional contour of 13
15 Cross-sectional contour of 13
16 Cage rim on 7
17 Cage rim on 7
18 Side face of 3
19 Side face of 3
$b_K$ Width of 4
$t_{LA}$ Depth of 11
$t_{LI}$ Depth of 12
$d_K$ Diameter of 4
$a_L$ Distance between 2 and 3

$A_{LQ}$ Bearing transverse axis
$A_{LL}$ Bearing longitudinal axis
$A_{KQ}$ Transverse axis of 4
n Rotational speed

The invention claimed is:

1. A ball roller bearing, comprising:
an outer bearing race;
an inner bearing race, and
a multiplicity of ball rollers, which are disposed between the outer bearing race and the inner bearing race, which have two side faces that are flattened symmetrically as a departure from a basic ball shape and are disposed parallel to one another, and which are held at uniform distances from one another in a circumferential direction by a bearing cage, the ball rollers have a width between the two side faces of approximately 70% of a diameter of a basic ball shape, the ball rollers rolling on a bearing surface of two groove-shaped raceways, each groove-shaped raceway is machined into an inside of the outer hearing race and into an outside of the inner bearing race and a depth of which is dimensioned in such a way that a distance between the inside of the outer bearing race and the outside of the inner bearing race is less than the width of the bah rollers,
wherein the bearing cage of the ball roller bearing is a window cage, individual cage pockets of which each have an integrated overall contour of a cross-sectional contour of a ball roller disposed in longitudinal and transverse directions relative to the circumferential direction and are disposed spaced apart in such a way that a sum of the flanking distances on either side of each ball roller in a circumferential direction at a pitch circle is less than the diameter of the basic ball shape of one individual ball roller.

2. The ball roller bearing as claimed in claim 1, wherein the depth of the groove-shaped raceway is the same in both the outer bearing and the inner bearing race and is about 17% to 25% of the diameter of the basic ball shape of the ball rollers.

3. The ball roller bearing as claimed in claim 2, wherein the cross-sectional contour of the cage pockets of the bearing cage which is disposed longitudinally with respect to the circumferential direction corresponds to a shape of a section plane disposed above a transverse axis of a ball roller.

4. The ball roller bearing as claimed in claim 2, wherein the cross-sectional contour of the cage pockets of the bearing cage which is disposed transversely to the circumferential direction has a shape of a section plane disposed directly on a transverse axis of the ball rollers.

5. The ball roller bearing as claimed in claim 2, wherein the bearing cage initially has a U-shaped profile cross-section, lateral profile webs of which are provided as cage rims for the purpose of avoiding transverse wobbling of the ball rollers.

6. The ball roller bearing as claimed in claim 5, wherein the cage rims have a length such that end edges are disposed approximately at a level of the pitch circle of the ball roller bearing after inward flanging toward the ball rollers, which concludes an assembly of the bearing.

7. The ball roller bearing as claimed in claim 6, wherein the bearing cage is produced from a sheet metal strip by profiling the cage rims, punching the cage pockets, cutting to length to give a dimension of a circumference, rolling into a ring and welding ends of the ring.

8. A method for assembling the ball roller bearing having the features of claim 1 with a cross/oblique/swivel assembly involving the inner bearing race, the bearing cage, the ball rollers and the outer bearing race, the method comprising the following steps;

a) arranging the inner bearing race and the bearing cage of the ball roller bearing in a concentric position relative to one another in an at least approximately common plane;
b) inserting the ball rollers in a position turned by 90° relative to an operating position thereof through the cage pockets of the bearing cage, into the raceway of the inner bearing race;
c) swiveling the ball rollers by 90° about a transverse axis thereof within the cage pockets, into a horizontal position, such that the side faces thereof are disposed parallel to a bearing longitudinal axis;
d) fitting the outer bearing race and the inner bearing race with the bearing cage and the ball rollers one inside the other in a position of the outer bearing race and the inner bearing race in which the outer bearing race and the inner bearing race are turned at least approximately by 90° relative to one another;
e) swiveling the outer bearing race and the inner bearing race with the bearing cage and the ball rollers relative to one another about a common bearing transverse axis until both bearing races are disposed coaxially with respect to one another;
f) imparting a rotary motion to one or both of the bearing races with a rotational speed at which the ball rollers automatically right themselves into the operating position within the raceways of the bearing races through rotating on themselves and through centrifugal force; and
g) flanging of the cage rims of the bearing cage in a direction of the side faces of the ball rollers to produce a guide for the purpose of avoiding transverse wobbling of the ball rollers, and optional greasing and/or sealing of the ball roller bearing.

9. The method as claimed in claim 8, wherein the method steps d) and e) are carried out as follows on the ball roller bearing in accordance with claim 2:
fixing the outer bearing race in a vertical position in an auxiliary device and inserting the inner bearing race together with the bearing cage and the ball rollers in a horizontal position in the outer bearing race;
tipping the ball rollers disposed on one side and the other side of the outer bearing race in opposite directions within the raceway of the inner bearing race into an obliquely tilted position relative to one of the two side faces of the inner bearing race;
swiveling the inner bearing race together with the bearing cage and the ball rollers relative to the outer bearing race with the two side faces of the inner bearing race in a lead, with respect to which the ball rollers are tilted;
producing a slight radial offset of the inner bearing race relative to the outer bearing race and swiveling a part of the inner bearing race which is opposite the direction of offset, together with the bearing cage and the ball rollers, into the outer bearing race; and
lowering the part of the inner bearing race which has already been swiveled in into the outer bearing race and swiveling a remaining part of the inner bearing race, together with the bearing cage and the ball rollers, into the outer bearing race.

10. The method as claimed in claim 9, wherein the ball rollers are inserted in a position turned by 90° into the raceway of the inner bearing race, through the cross-sectional contour of the cage pockets which is disposed transversely to the circumferential direction.

11. The method as claimed in claim 9, wherein during the swiveling of the ball rollers within the cage pockets, into a horizontal position, the transverse axis thereof is disposed below a level of an underside of the bearing cage.

12. The method as claimed in claim 9, wherein fitting of the outer bearing race and the inner bearing race one inside the other is performed in such a way that initially two diametrically opposite ball rollers make contact with the raceway of the outer bearing race.

13. The method as claimed in claim 9, wherein, after being tipped into an oblique position relative to the side faces of the inner bearing race, the ball rollers are disposed approximately at a level of the top side of the bearing cage on their lowered side.

14. The method as claimed in claim 9, wherein the radial offset of the inner bearing race relative to the outer hearing race during swiveling in is accomplished by raising the inner bearing race in a direction of parts of the inner bearing race still situated outside the outer bearing race.

15. The method as claimed in claim 9, wherein the part of the inner bearing race which has already been swiveled in is lowered into the outer bearing race in a direction opposite to that of the part of the inner hearing race which is not yet in an end position.

16. The method as claimed in claim 9, wherein, while a rotary motion is being imparted to the outer bearing race, the ball rollers are in contact by means of boundary zones of the bearing surfaces with boundary zones of the two groove-shaped raceways of the outer bearing race and the inner bearing race.

17. The ball roller bearing as claimed in claim 1, wherein the depth of the groove-shaped raceway is different in the outer bearing and the inner bearing race and is about 17% in the outer bearing race and up to 30% in the inner bearing race of the diameter of the basic ball shape of the ball rollers.

18. The ball roller bearing as claimed in claim 2, wherein the assembled ball roller bearing has a rolling element filling ratio of about 85% to 95% and a life of about 180% to 240%, based on a figure of 100% for the life of a deep groove ball bearing of a same construction.

19. The method as claimed in claim 8, wherein method steps d) and e) are carried out as follows on a the ball roller bearing in accordance with claim 17:

fixing the inner bearing race with the bearing cage and the ball rollers in a horizontal position in an auxiliary device;

tipping the ball rollers disposed on one side and the other side of the bearing transverse axis in opposite directions within the raceway of the inner bearing race into an obliquely tilted position relative to one of the two side faces of the inner bearing race; and pushing the outer bearing race in a vertical position onto the inner bearing race and swiveling the outer bearing race relative to the inner bearing race with the bearing cage and the ball rollers in a direction of lowered sides of the ball rollers which are tipped.

\* \* \* \* \*

UNITED STATES PATENT AND TRADEMARK OFFICE
CERTIFICATE OF CORRECTION

PATENT NO.       : 8,382,379 B2                                          Page 1 of 1
APPLICATION NO. : 12/936011
DATED            : February 26, 2013
INVENTOR(S)      : Doeppling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 229 days.

Signed and Sealed this
First Day of September, 2015

Michelle K. Lee
*Director of the United States Patent and Trademark Office*